US012500770B2

(12) United States Patent
Duvdevani et al.

(10) Patent No.: US 12,500,770 B2
(45) Date of Patent: Dec. 16, 2025

(54) USER AUTHENTICATION TECHNIQUES ACROSS APPLICATIONS ON A USER DEVICE

(71) Applicant: Circle Internet Group, Inc., New York, NY (US)

(72) Inventors: Itay Duvdevani, Rosh HaAyin (IL); Roy Shifroni Udassin, Givaataim (IL); Sona Rathod, San Francisco, CA (US); Oliver Sam Collins, Palo Alto, CA (US); Jun Sun, Fremont, CA (US); Mark Blelock Atherton, Lymington (GB); Cihad Oge, London (GB); Asim Viladi Oglu Manizada, Kirkland, WA (US); Feixiong Zhang, Santa Clara, CA (US); Yuhan Guo, Sunnyvale, CA (US); Huapeng Zhou, Mountain View, CA (US); Vincent Christian Daniel Mauge, Palo Alto, CA (US); Kyle Steven Nekritz, New York, NY (US); Parvi Kaustubhi, San Jose, CA (US); Sanjay Sane, Fremont, CA (US); Shuo Shen, Mountain View, CA (US); Kawin Prakobkit, Hayward, CA (US); Shivram Vaman Khandeparker, Chiswick (GB); Vignesh Raghuraman, London (GB)

(73) Assignee: Circle Internet Group, Inc., New York, NY (US)

( * ) Notice: Subject to any disclaimer, the term of this patent is extended or adjusted under 35 U.S.C. 154(b) by 587 days.

(21) Appl. No.: 17/683,157

(22) Filed: Feb. 28, 2022

(65) Prior Publication Data
US 2022/0353081 A1 Nov. 3, 2022

Related U.S. Application Data

(60) Provisional application No. 63/178,977, filed on Apr. 23, 2021, provisional application No. 63/191,559, (Continued)

(51) Int. Cl.
*H04L 9/32* (2006.01)
*G06F 16/955* (2019.01)
*H04L 9/08* (2006.01)

(52) U.S. Cl.
CPC ......... *H04L 9/3221* (2013.01); *G06F 16/955* (2019.01); *H04L 9/0825* (2013.01); *H04L 9/3213* (2013.01); *H04L 9/3271* (2013.01)

(58) Field of Classification Search
CPC ... H04L 9/3221; H04L 9/0825; H04L 9/3213; H04L 9/3271; H04L 9/0891; H04L 9/3218; G06F 16/955
See application file for complete search history.

(56) References Cited

U.S. PATENT DOCUMENTS

| 8,171,287 B2 | 5/2012 | Villela |
| 9,684,775 B2 | 6/2017 | Gupta et al. |

(Continued)

FOREIGN PATENT DOCUMENTS

| WO | WO-2015162424 A1 * | 10/2015 | ............. H04L 63/08 |

OTHER PUBLICATIONS

Datatracker.ietf.org [online], "Using the Secure Remote Password (SPR) Protocol for TLS Authentication," Nov. 2007, retrieved on Aug. 15, 2024, retrieved from URL<https://datatracker.ietf.org/doc/html/rfc5054>, 24 pages.

*Primary Examiner* — Izunna Okeke
(74) *Attorney, Agent, or Firm* — Fish & Richardson P.C.

(57) ABSTRACT

According to examples, a system for enabling user authentication may include a processor and a memory storing
(Continued)

instructions. The processor, when executing the instructions, may cause the system to receive user login credentials and initiate a user authentication process by receiving a challenge configured using an attribute of a system including the processor. The processor executes further instructions to determine the attribute value and to derive a zero-knowledge proof in response to the challenge. The zero-knowledge proof is provided to the challenge issuer to access services of one or more applications.

18 Claims, 18 Drawing Sheets

Related U.S. Application Data filed on May 21, 2021, provisional application No. 63/251,370, filed on Oct. 1, 2021.

(56) References Cited

U.S. PATENT DOCUMENTS

| | | | |
|---|---|---|---|
| 9,858,405 B2 | 1/2018 | Ranadive et al. | |
| 10,108,787 B2 | 10/2018 | Yang et al. | |
| 10,536,436 B1 | 1/2020 | Barbour et al. | |
| 11,663,030 B2 | 5/2023 | Kaimal et al. | |
| 2019/0349191 A1 | 11/2019 | Soriente et al. | |
| 2020/0106778 A1* | 4/2020 | Park | H04L 63/108 |
| 2020/0374121 A1 | 11/2020 | Momchilov et al. | |

* cited by examiner

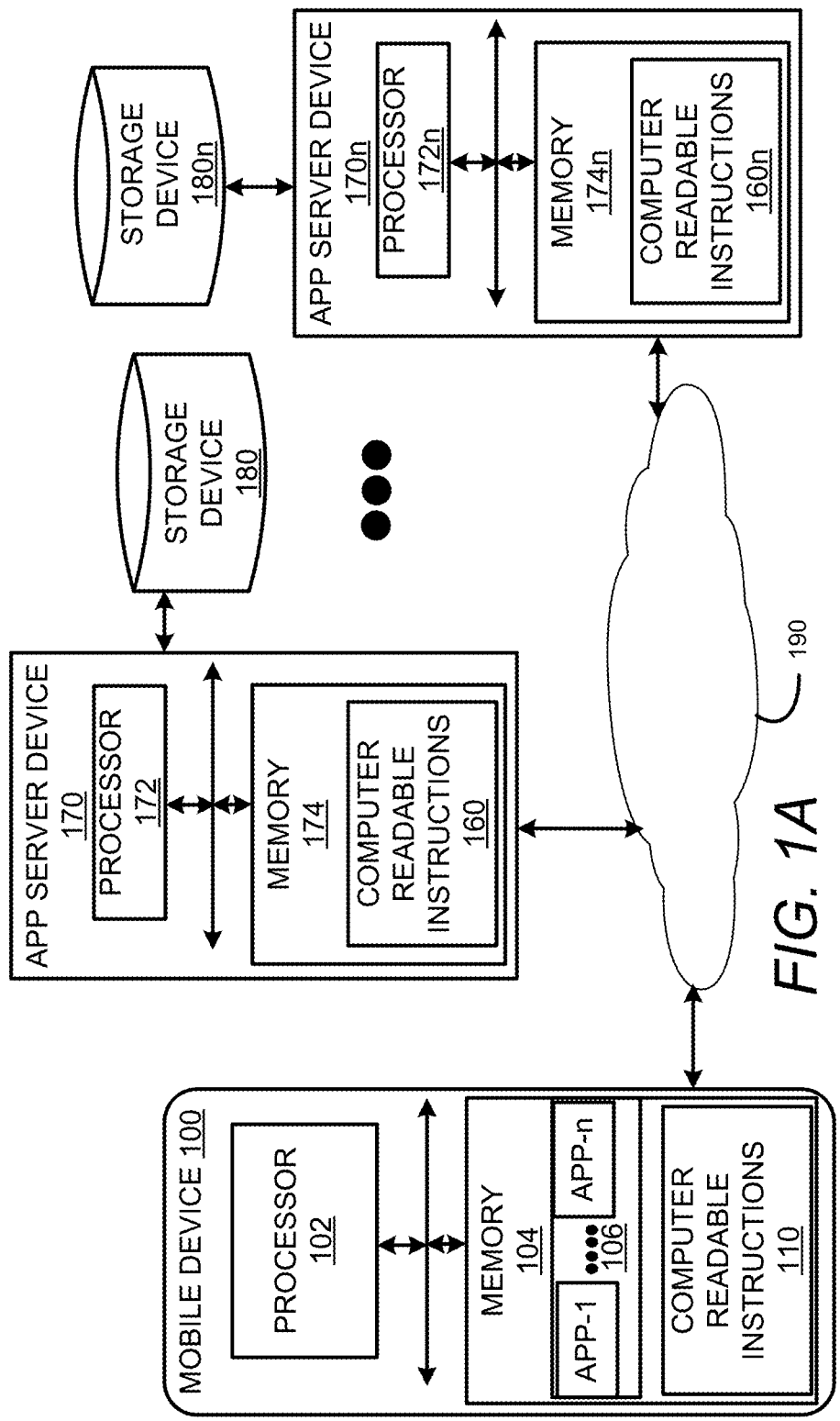

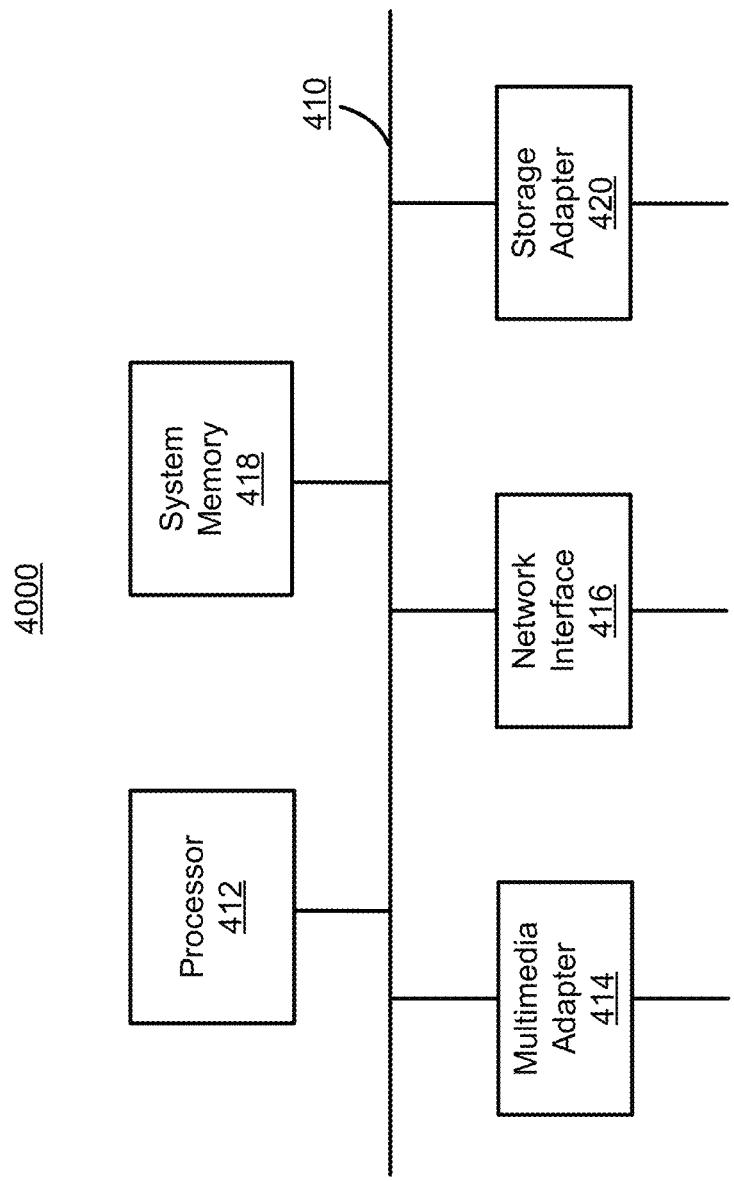

USER AUTHENTICATION TECHNIQUES ACROSS APPLICATIONS ON A USER DEVICE

PRIORITY

This patent application claims priority to U.S. Provisional Patent Application No. 63/178,977, entitled "Improved User Authentication Techniques Across Applications on a User Device," filed on Apr. 23, 2021, U.S. Provisional Patent Application No. 63/191,559, entitled "Detection of Compromise of User Information and Identity via Use of Dynamic Elements in Data Identifiers," filed on May 21, 2021, and U.S. Provisional Patent Application No. 63/251,370, entitled "Access Control on Content Delivery Networks," filed on Oct. 1, 2021, all of which are hereby incorporated by reference herein in their entireties.

TECHNICAL FIELD

This patent application relates generally to secure user authentication, and more specifically, to improved user authentication techniques across applications in a user device. This patent application relates generally to data security and protection, and more specifically, to systems and methods for generation and implementation of data identifiers comprising dynamic elements that may enable detection of compromise of user information and identity. This patent application relates generally to mechanisms for authenticating users to a content delivery network or content distribution network (CDN), thereby improving the security of the content delivery network (CDN).

BACKGROUND

User authentication is about how users prove their legitimate right to access resources. User authentication can include authentication of the user to a particular application (or "app") or authentication of the user to one or more devices. User authentication to apps can be carried out in a single step or multiple steps depending on the security level required for the specific application. Simple applications which have no specific need for security may involve a single-step authentication involving just usernames and passwords. Applications such as communication applications e.g., email programs or financial apps may implement multi-step authentication procedures. With great accessibility to computing devices, user authentication techniques that are secure is highly desired.

Computer "hacking" or "hijacking" may include usurping of a valid computer session by an attacker to gain unauthorized access. A first method that an attacker may utilize to attempt unauthorized access may be theft of log-in credentials, such as usernames and passwords. However, in many instances, various detection methods and mitigations (e.g., based on log-in characteristics) may be sufficient to counter these attempts.

A second method of session hijacking may be "cookie hijacking". In some examples, a "cookie" may be short packet of data passed between communicating programs for authentication purposes. In some examples, cookie hijacking may enable theft and use of a cookie by an attacker looking to impersonate a user. In some examples, cookies may represent a device-identifier or a "secret" that may allow access to systems that require an authenticated user.

Upon hijacking a user's cookie, activity from an attacker's device may appear to originate from the victim's device. Consequently, the attacker may be able to blend their abusive activity with the legitimate activity of the user.

A content delivery network (CDN) is made up of a group of geographically distributed servers that work together to speed up content delivery across the internet. A content delivery network (CDN) may provide for quick delivery of internet content such as webpages including images, video clips, JavaScript files, etc. The high volume of content delivery across the internet including mobile networks leads to the increasing use of content delivery network (CDNs). Although a content delivery network (CDN) may not host content and therefore may not replace a web hosting server, the content delivery network (CDN) may nevertheless cache content at the network edge.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 1A illustrates block diagrams of two computer systems according to an example.

FIG. 7 illustrates a block diagram of a computer system to that may be implemented to detect account compromise via use of dynamic elements in data identifiers, according to an example.

DETAILED DESCRIPTION

Figure 1B:
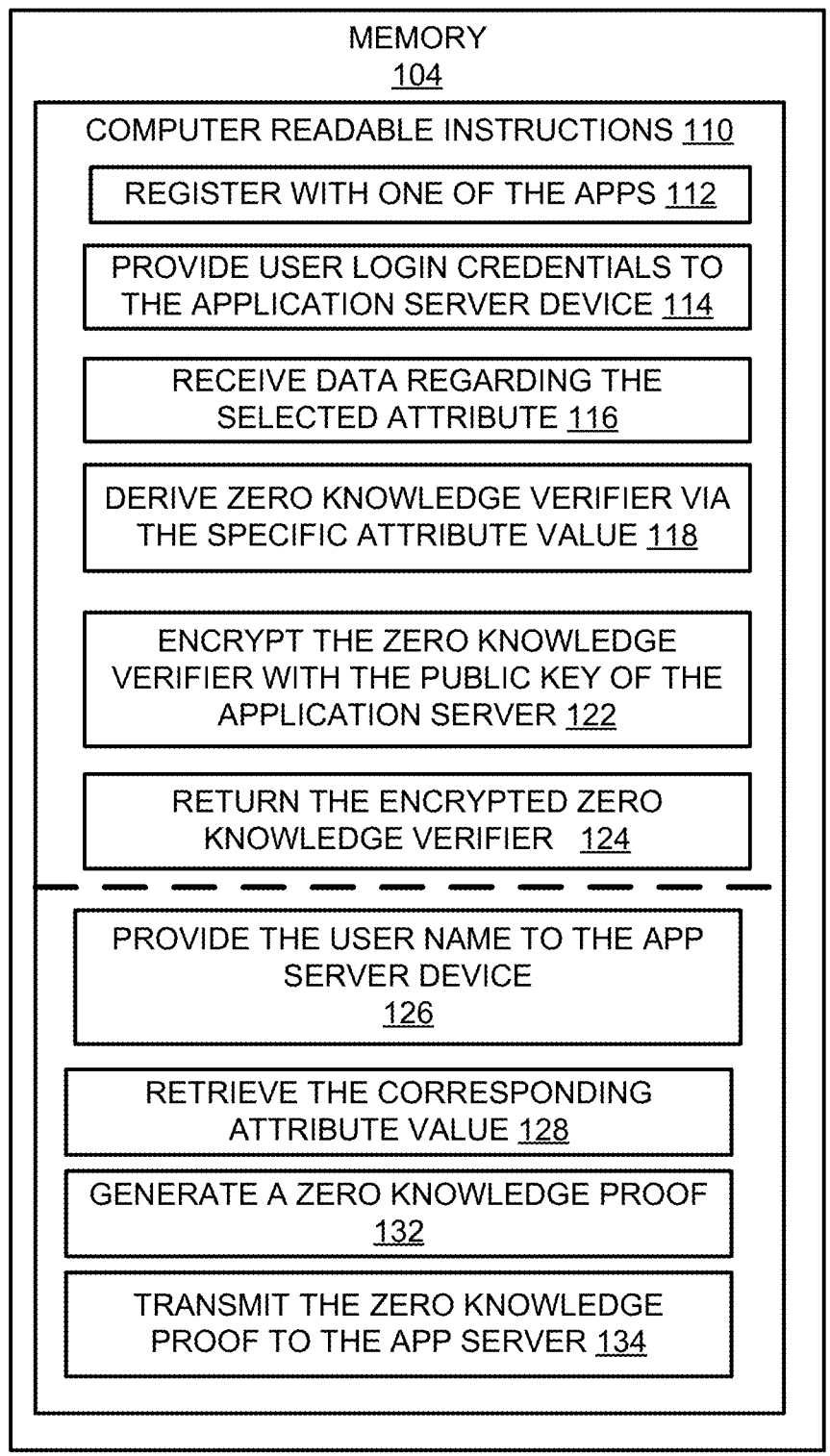
FIG. 1B illustrates a block diagram of a memory including computer-readable instructions according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Systems and methods for authenticating users across multiple applications in a computing device are disclosed. Authenticating users especially with mobile devices such as smartphones involves confirming ownership of a phone number which enables determining if a user is indeed the same person who they claim to be. Such verification or authentication is essential to account security and ensuring that user accounts are not accessed by unauthorized individuals. One consistent technique employed across the mobile industry is to send a unique code (e.g., one-time password (OTP)) to the claimed phone number by a small messaging service (SMS) and ask the user to re-enter this unique code into the software to confirm ownership.

However, the exchange of SMS may not be an optimal procedure for user authentication due to various reasons. SMS can serve as a critical failure point for users who do not have cellular service or immediate access to a device to receive the SMS. Even if the user has a facility to receive SMS, the user has to wait for the SMS to be delivered and then manually enter the codes into the correct app. Authentication via SMS can be a security risk for an account owner either due to the message being intercepted in the SMS delivery chain or a set of social engineering attacks where the 'keys to the safe' and handed over directly to a hacker. Furthermore, multiple SMS messages can be sent to the same device and SIM card within days, hours or even minutes of each other as each 'app' vendor must independently verify the phone number by sending a new SMS at each turn. The proposed user authentication methodology provides a technical solution to the problem of the exchange of multiple SMS messages by multiple apps on the same device each time the user of the device seeks access to the corresponding 'apps'.

The user authentication techniques disclosed herein aims to solve the aforementioned problems by storing previous phone number confirmations so that the apps on a mobile device that require user authentication can skip the step of exchanging SMS messages with the app server if there is sufficient evidence on the mobile device that an ID of the mobile device, e.g., a phone number has already been verified within a predetermined time threshold such as a day, a week, etc. To implement such a user authentication process, a verification application is preloaded on the mobile device. The verification application collects "attributes" from the device. The attributes can include software or hardware identifiers or other outputs of device-specific functions, attributes from the local cellular and WIFI networks, sim card, geographic location, biometrics of the user, etc. The verification application derives a "client password" from the attributes. The "client password" is then used to derive an on-demand, zero-knowledge, non-deterministic verifier. A zero-knowledge verifier does not reveal anything of value about the attributes that were used to create it. Each time a different verifier is generated even if the same set of attributes are used since the verifier is non-deterministic. Non-deterministic verifiers from the same attributes are indistinguishable from verifiers created for other attributes.

Upon establishing a trusted context (i.e., upon verifying a username and password), the verifier is sent to the server and stored in associated with the context owner identity (e.g., user account). At a later time, the verifier can be used to ensure that the mobile device has the same attributes as were present when the verifier was created without actually revealing the contents of the attributes to the server. The determination regarding the attributes stored by the mobile device is based on an OTP exchange with a server. In an example, the Password Authenticated Key agreement (PAKE) protocol can be used for OTP transport.

An example of attribute verification can include steps wherein:
(1) The server can generate an OTP code and use the verifier to encrypt it to a challenge.
(2) Only a device in possession of the correct attributes will be able to recover the OTP code from the challenge.
(3) Knowledge of the OTP code proves that the mobile device is in possession of the correct attributes without revealing any of the actual attribute values to the server.

The disclosed user authentication techniques thus enable verifying user identity while minimizing the use of SMS messages and improving communication security since none of the attribute values are shared with the server.

Figure 1C:
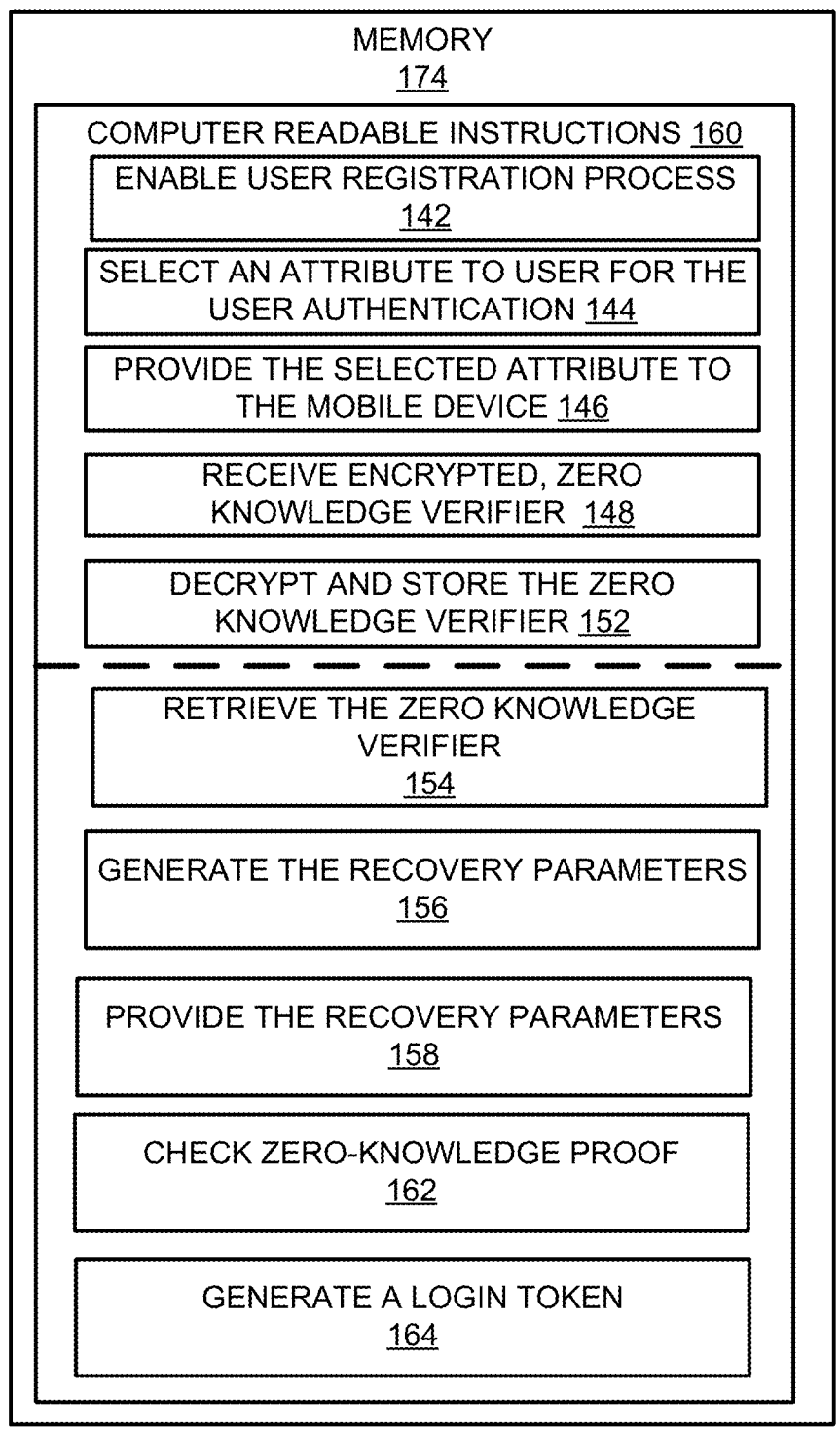
FIG. 1C illustrates a block diagram of a memory including computer-readable instructions according to an example.

Reference is now made with respect to FIGS. 1A, 1B, and 1C which illustrate block diagrams of computer systems according to an example. As shown in FIG. 1A a plurality of computing devices including a mobile device 100, one or more app server devices including the app server device 170 with respective processors 102, 172, and respective memories 104, and 174 used for user authentication are connected via the network 190. A plurality of app server devices including 1701, . . . , 170*n* (where n is a natural number and n=1, 2, 3 . . . ) substantially similar to the app server device 170 that respectively correspond to the plurality of apps 106 including App-1, App-n can communicate with the mobile device 100 via the network 190. It can be appreciated that while it is described herein that one app server corresponds to one of the plurality of apps 106, this is not necessary and that more than one server can be associated with one of the apps or two apps can be hosted by the same server. Furthermore, the details of the user authentication process and the elements of the app servers 170, . . . , 170-*n*, will be described below with respect to the mobile device 100 and the app server device 170. It can be appreciated that a similar user authentication process can be applied with respect to authentication of a user of the mobile device 100 with the remaining app servers, 1701, 1702, . . . 170n.

FIG. 1B illustrates a block diagram of the memory 104 including computer-readable instructions 110, that when executed by the processor 102 may be configured to execute the user authentication procedures. FIG. 1C illustrates a block diagram of the memory 174 including computer-readable instructions 160, that when executed by the processor 172 may be configured to execute the user authentication procedures. The mobile device 100 and the app server devices 170, . . . , 170n, may be electronic or computing devices configured to transmit and/or receive data (e.g., via a social media application), and in one example, the user communication device 100 may be a smartphone, a laptop, a smartwatch or other mobile communication device.

The computer systems 100, and 170 . . . , 170n, can communicate with each other via the network 190 that can be a local area network (LAN), a wide area network (WAN), the Internet, a cellular network, a cable network, a satellite network, or another network. Network 190 may further include one, or any number, of the exemplary types of networks mentioned above operating as a stand-alone network or in cooperation with each other. For example, the network 160 may utilize one or more protocols of one or more clients or servers to which they are communicatively coupled. Network 190 may facilitate the transmission of data according to a transmission protocol of any of the devices and/or systems in the network 190. Although network 190 is depicted as a single network, it should be appreciated that, in some examples, the network 190 may include a plurality of interconnected networks as well.

It should be appreciated that the systems and subsystems shown herein, as described herein, may include one or more servers or computing devices. Each of these servers or computing devices may further include a platform and at least one application. An application (e.g., one of the plurality of apps 140) may include software (e.g., machine-readable instructions) stored on a non-transitory computer-readable medium and executable by a processor. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

While the servers, systems, subsystems, and/or other computing devices may be shown as single components or elements, it should be appreciated that one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the mobile device 100 or the system environment including the mobile device 100 and the app server devices 170, . . . , 170n.

The computer systems used as the app server devices may further include respective storage devices 180, . . . , 180n. In one example, the storage devices 180, . . . , 180n, may include any number of servers, hosts, systems, and/or databases that store data to be accessed by the mobile device 100 or other systems (not shown) that may be communicatively coupled thereto. Also, in one example, the servers, hosts, systems, and/or databases of the storage devices 180, . . . , 180n, may include one or more storage mediums storing any data, and may be utilized to store information (e.g., user information, demographic information, preference information, etc.) relating to users of a social media application facilitating user authentication.

The mobile device 100 has a plurality of apps 106 including App-1, . . . , App-n, loaded into the memory 104 for executing various functions that enable the user to access various services such as communication services including emails, messaging, social media platforms, financial services including mobile payment apps, document processing services including apps to create or edit documents, etc. One or more of the plurality of apps 106 can require verification of the user's identity via an authentication process. A user identity can be a globally unique invariant and an immutable client-side state. Some attributes of a good user identity include continuity over time and configuration changes, strong association with a single actor, and capability of being securely authenticated. New identities can be created on-demand while existing identities are authenticated using globally unique IDs.

An identity is represented by a globally unique ID and proof of the bind data. On the server-side (e.g., the app server device 170) are implemented identity verifiers which determine if a user is actually the person who is authorized to access the services. The protocols implemented by identity services need to be secure against passive and active attackers, encrypted end-to-end with the server, and configured as zero-knowledge protocols so that the bind data is never revealed. An identity service as disclosed herein for identity verifications operates on the client-side (e.g., on the mobile device 100) by accessing certain device-side attributes e.g., bind variables and combining multiple attributes to produce attribute data. Further, in accordance with the disclosed identity service, zero-knowledge proofs of the attributes are produced at the mobile device 100 by the processor 102 that executes the computer-readable instructions 110 which can be called from the plurality of apps 106. The disclosed identity service also operates on the server-side (e.g., on the app server device 170 and the identity server device 150) to manage trust in identities based on the attributes type to authenticate identities. Examples of attributes can include a secure random value which may be stored in the internal storage of the mobile device 100, Mobile Station International Subscriber Directory Number (MSISDN), International Mobile Equipment Identity (IMEI) which is a unique 15-digit code that precisely identifies the mobile device 100 with the Subscriber Identity Module (SIM) card input, international mobile subscriber identity (IMSI)—a number that uniquely identifies every user of a cellular network obtained from the SIM card, and authentication vectors from the SIM. An identity can be bound to one or more attributes for a varying degree of security and robustness as controlled by the app server at the time of identity creation.

The mobile device 100, and the app server device 170 initially execute a user registration process to set up a user authentication procedure as disclosed herein. The mobile device 100 initially executes instructions 112 to register with one of the plurality of apps 106, e.g., App-1, which requires a user to log in, the user may establish the login credentials including the username and password with the app server device 170. The app server device 170 can execute instructions 142 to execute the registration process of the user by storing the username and password of the user for App-1. Upon receiving the user name and password, the app server device 170 in turn creates an attribute-based identity for that username-password combination for App-1 as detailed below, wherein the attribute may include one or more of the attributes.

Particularly, the app server device 170 is configured to capture a snapshot of the attributes on the mobile device 100 at some time point and verify that the attributes are unchanged at a later time. The exact attributes that are used for identity verification can depend on specific use cases. An ordered set of attributes can be termed as an identity suite. Each identity suite can have different security attributes and different survivability. An identity suite together with the time at which the snapshot was captured and verified can be termed as an identity scheme. Different schemes using different attributes can be implemented based on the requirements of the use cases. The attribute-based identity is provided by the app server device 170 to the mobile device 100.

The app server device 170 executes instructions 144 to select one of the attributes as an attribute for user authentication or recovery process based, for example, on the nature of App-1. The app server device 170 executes instructions 146 to communicate the selected attribute for recovery to the mobile device 100. The mobile device 100 executes instructions 116 to receive the data regarding the selected attribute from the app server device 170. The mobile device 100 further executes the computer-readable instructions 118 to retrieve the specific attribute value to derive a zero-knowledge verifier from that attribute. The zero-knowledge verifier is encrypted by the mobile device 100 with the public key of the app server device 170 in accordance with the instructions 122 and returned to the app server device 170 by the mobile device 100 by executing the instructions 124. The app server device 170 executes the instructions 148 to receive the encrypted, zero-knowledge verifier. Instructions 152 are used by app server device 170 to decrypt and store the encrypted zero-knowledge verifier for subsequent user authentication.

A similar procedure as outline above can be executed by the mobile device 100 and each of the app server devices 1701, . . . , 170n, for registering the corresponding ones of the plurality of apps 106 for the attribute-based recovery process that mitigates the need for exchange of SMS communications in user authentication procedures. Therefore, whenever a registration request is received for one of the plurality of apps 106, a procedure as outlined above is executed to set up an attribute-based user authentication process. Since an attribute-based user authentication process is initially set up for App-1 with the corresponding app server device(s), selecting the attribute may be skipped in some examples and the same attribute may be selected for setting up the user authentication procedure. However, in some examples, a different attribute may be chosen for the corresponding App and an attribute-based user authentication may be set up for the selected attribute.

When the user subsequently attempts to access the App-1 and forgets the password, the user name is initially provided to the app server device 170 by the mobile device by executing instructions 126. The app server device 170 implements the corresponding attribute-based user authentication procedure by executing instructions 154 to retrieve the zero-knowledge verifier associated with user credentials which may include only the user name in this example. The recovery parameters associated with the zero-knowledge verifier are generated by the app server device 170 using the zero-knowledge verifier by executing the instructions 156. The app server device 170 then executes instructions 158 to authenticate the user with the recovery parameters.

The mobile device 100 executes instructions 128 to retrieve the corresponding attribute value. A zero-knowledge proof is generated from the recovery parameters and the attribute value by the mobile device 100 by executing the instructions 132. The zero-knowledge proof is provided to the app server device 170 by executing the instructions 134. The app server device 170 executes instructions 162 to check the zero-knowledge proof received from the mobile device 100 in comparison with the zero-knowledge verifier. Based on the authenticity of the zero-knowledge proof, the app server device 170 executes instructions 164 to generate a login token that will enable the user to access App-1.

Figure 2A:
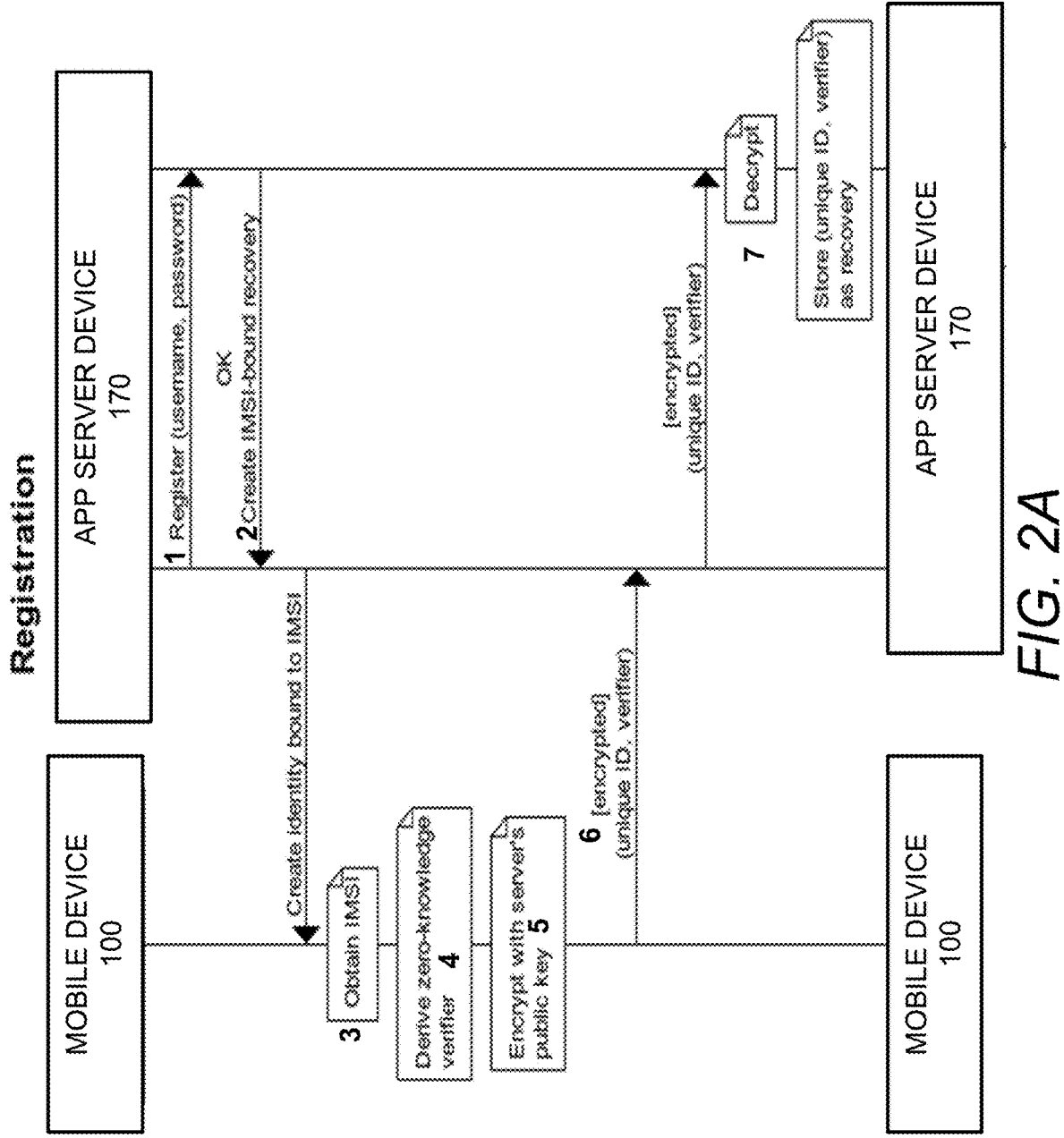
FIG. 2A shows a sequence diagram of a registration process between a mobile device and an app server device according to an example.

FIG. 2A shows a sequence diagram of the registration process between the mobile device 100 and the app server device 170 in accordance with a disclosed example. The user authentication process as described above can be implemented by an agent executed by processor 102 of the mobile device 100 as at least part of the computer-readable instructions 110. Upon receiving (1) the username and password from the mobile device 100 during the initial registration process, the app server device 170 creates (2) an attribute-based recovery, e.g., an IMSI bound recovery. Accordingly, the mobile device 100 obtains (3) the IMSI and derives (4) a zero-knowledge verifier from the IMSI. The zero-knowledge verifier may optionally be encrypted (5) with the public key of the app server. The encrypted unique ID with the verifier is provided (6) to the app server device 170. The encrypted unique ID and the verifier is decrypted and stored (7) for recovery at the app server device 170.

Figure 2B:
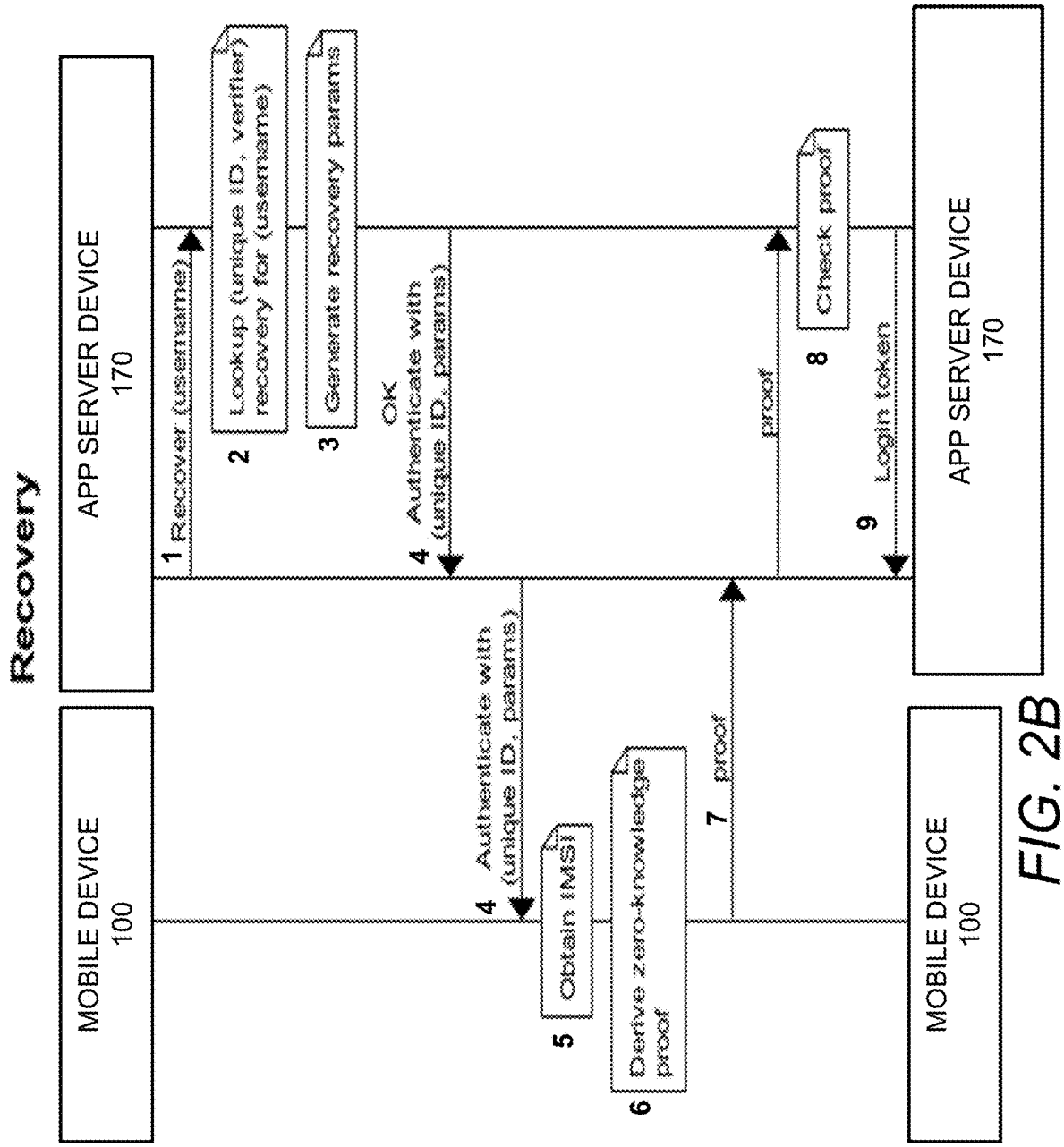
FIG. 2B shows a sequence diagram for a recovery process in accordance with the disclosed examples.

FIG. 2B shows a sequence diagram for the recovery process in accordance with the disclosed examples. When a user provides a username/password combination for a multi-step authentication process or if the user has indicated a forgotten password, the recovery process associated with the username is initiated (1) by the app server device 170. The app server device 170 looks up (2) the unique ID and the verifier associated with the username and generates (3) the recovery parameters. The app server device 170 initiates (4) a recovery process/user authentication process with the generated parameters. For example, the app server device 170 can generate an OTP code, and use the verifier to encrypt the OTP code to a "challenge". The challenge is framed so that only a device in possession of the correct attributes (i.e., the IMSI) will be able to recover the OTP code from the challenge. Upon receiving the parameters, the mobile device 100 obtains (5) the IMSI and derives (6) the zero-knowledge proof (i.e., the OTP) and provides (7) the proof to the app server device 170. The proof is checked (8) at the app server device 170 and a login token is issued (9) if the mobile device 100 checks out to be authentic else, the login attempt is rejected. As the verifier does not include the value of the IMSI but is rather derived from the IMSI, the IMSI is not directly shared with the app server device 170. Furthermore, the generation and verification of the challenge/proof occurs as communication by the agent on the mobile device 100 with the app server 170 as opposed to communication via SMS. Therefore, the use of SMS within the authentication process is minimized.

Figure 3:
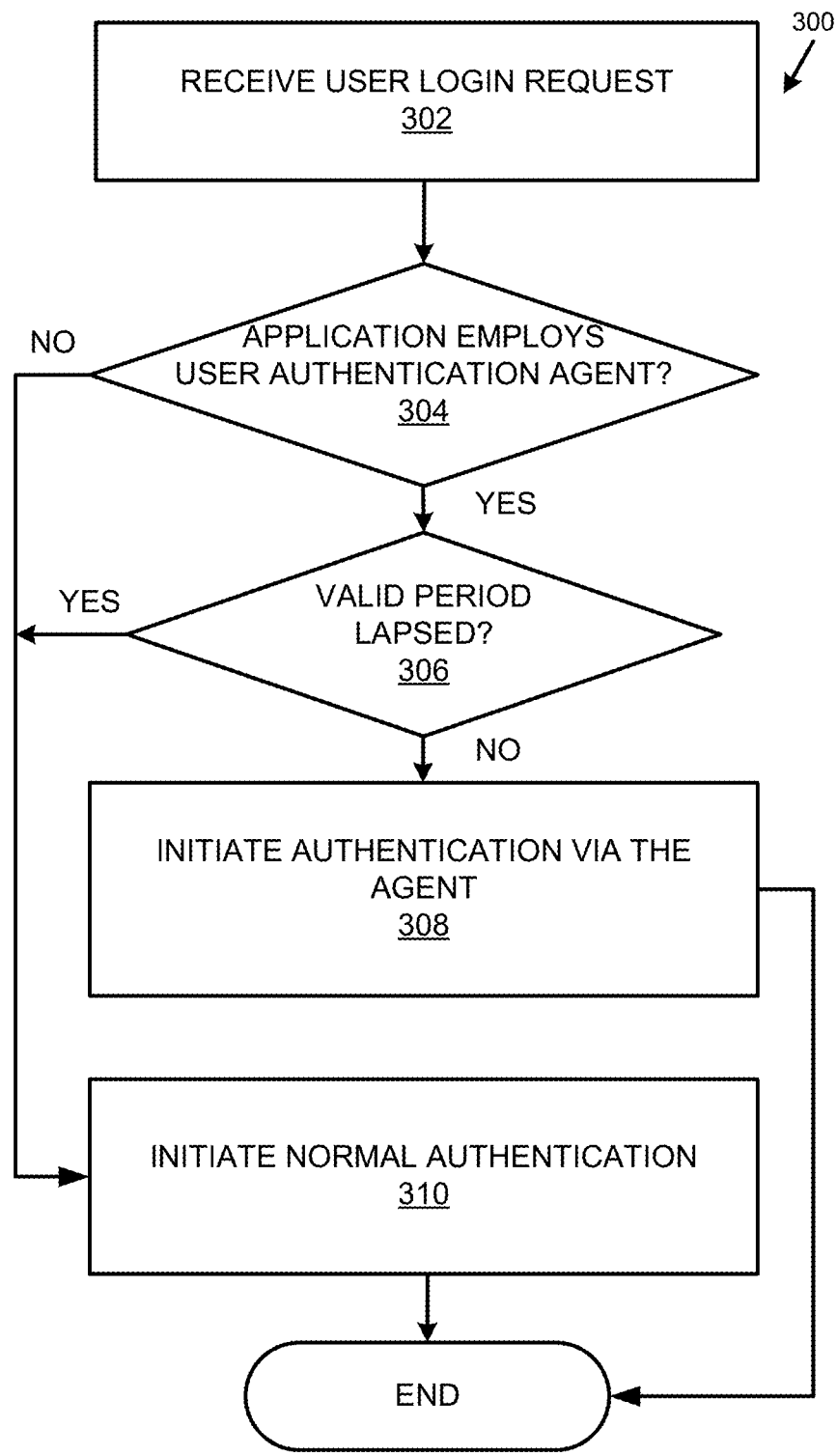
FIG. 3 shows a flowchart that details an implementation of a multi-step authentication process or a password recovery process in accordance with the examples disclosed herein.

FIG. 3 shows a flowchart 300 that details an implementation of a multi-step authentication process or a password recovery process in accordance with the examples disclosed herein. In an example, the process detailed in the flowchart 300 may be implemented by the app server device 170. At 302, a user login request is received at the mobile device 100 for one of the plurality of apps 106. It is determined at 304 if the app is registered with the user authentication agent. If the app does not employ the user authentication agent, the method moves to 310 wherein a normal authentication process (e.g., using SMS) is initiated. If it is determined at 304 that the app employs the user authentication agent, the method moves to 306 to determine if the valid period to use the attribute-based recovery has lapsed. In an example, the attribute-based verifier can be configured for a valid period (e.g., 24 hours, a week, etc.). Multiple apps of the plurality of apps 106 can employ the user authentication agent for authenticating users in a multi-step authentication process, or for password recovery, etc. Therefore, if one of the apps has employed the user authentication agent for verifying user identity and another app that also employs the same attributes initiates the attribute-based recovery within the valid period, the user can be automatically authorized without having to re-execute the authorization process. Therefore, if it is determined at 306 that the valid period has not elapsed, then the method moves to 308 to initiate authentication via the user authorization agent. If it is determined at 306 that the valid period has lapsed or expired, the app server 170 may require an SMS authentication and therefore the method moves to 310 to implement a normal authentication process. Flowchart 300 presents a time-based invalidation; however, this is just illustrative and the app server 170 may employ any number of methods to determine whether a verifier is still valid.

Computer device "hacking" or "hijacking" may be the exploitation of a valid computer session to gain unauthorized access to information or services in a computer system. A first method may be theft of log-in credentials, such as usernames and passwords. However, in many instances, reasonable mitigations based on session-level detection methods and log-in characteristics (e.g., log-in times) may counter and/or mitigate such hijacking efforts.

A second method may be theft of data identifiers. As used herein, a data identifier may include a short packet of data to be passed between communicating programs to authenticate user identity and/or activity. In some examples, the data identifier may serve to authenticate user activity and/or identity as associated with an application (e.g., a browser application). Also, in some examples, the data identifier may be stored on a user's computer (e.g., in the browser).

Data identifiers may be particularly convenient for a user, as they may remove a necessity to enter authentication information each time a user may wish to perform an action associated with an application. Instead, upon verification, the data identifier may be used to (automatically) confirm authenticity.

In some instances, data identifiers may also be referred to as a "cookies". In some examples, these cookies may be of various types. For example, in one instance, the data identifier may be associated with a user device (i.e., a "device cookie"), and may be utilized to identify a browser or a device associated with a browser. In another example, the data identifier may be associated with a user session (i.e., a "session cookie"), and may be used to authenticate session-related user actions.

In some instances, data identifiers may be stored in a list or "library" of data identifiers. For example, in some instances, the data identifiers may be stored in a store of an application (e.g., a browser application), wherein the data identifiers may be organized by associated domains. In some examples, the list or library of data identifiers may be referred to as a "cookie jar".

Figure 4:
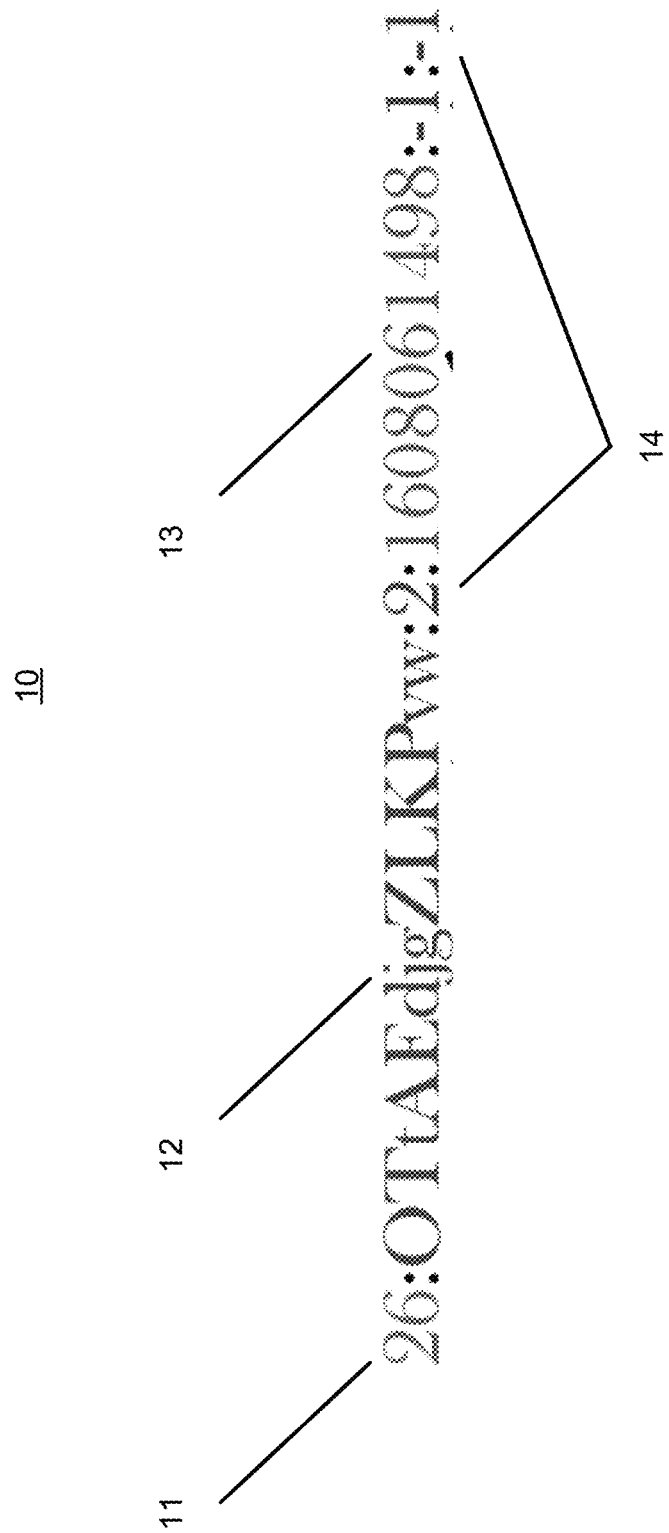
FIG. 4 illustrates an example of a session cookie, according to an example.

An example of a session cookie 10 is illustrated in FIG. 4. In this example, the session cookie 10 may include session identifier (ID) 11, a client session covert portion (or "secret") 12, a session creation time 13 and deprecated parts 14. In some examples, the session ID 11 may identify the current session that the user may be conducting, while the session covert portion 12 may include a cryptographic hash related to authentication information (e.g., log-in and passwords) associated with a current session. Also, in some examples, the session creation time 13 may indicate when the current session was initiated, while the deprecated parts 14 may include portions of the session cookie 10 that are no longer valid or have been replaced.

In some instances, an attacker may steal a data identifier by accessing a store of data identifiers (e.g., in a cookie jar) on a victim's computer. Upon stealing the data identifier, the attacker may access a user's account. That is, the attacker may "hijack" the victim's session by opening a browser on the attacker's machine (or any other machine), navigate to a resource (i.e., the domain) the data identifier may be associated with, set the data identifier for use and refresh the page so as to be logged in as the victim. In some instances, a session cookie may indeed be singularly sufficient to access control (i.e., "take over") over a user's account or session, at which point it may become nearly impossible to detect/distinguish the imposter's use.

Figure 5:
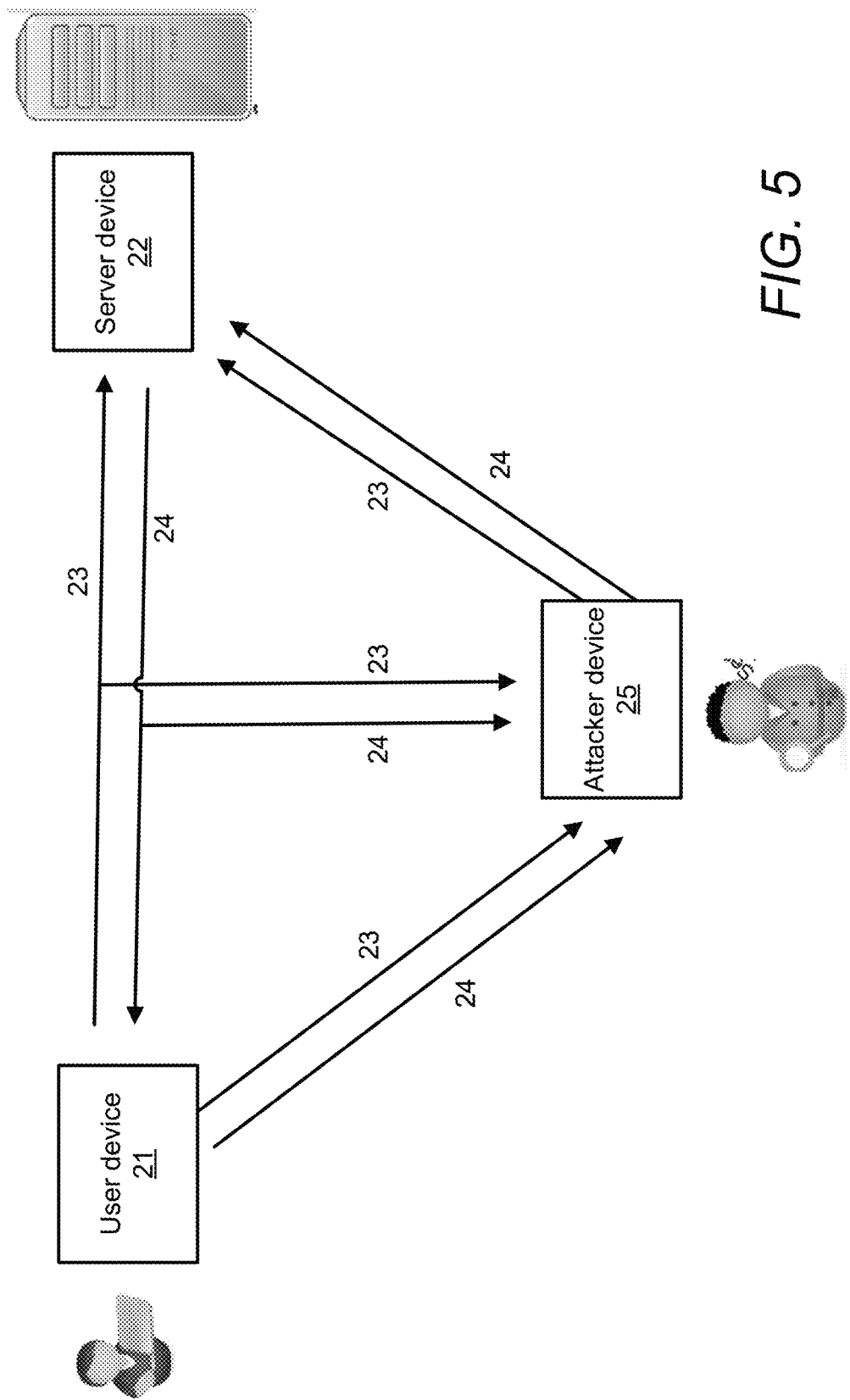
FIG. 5 illustrates examples of various hijacking approaches that may be utilized by an attacker, according to examples.

Examples of a various hijacking techniques that may be utilized by an attacker are illustrated in FIG. 5. As shown in FIG. 5, a user may utilize a user device 21 to communicate with a server device 22 to utilize an application located on the user device 21. In this example, the application may be a social media application. In this example, to log in to the application, the user may transmit log-in information 23, such as a username (e.g., "user1") and/or a password (e.g., "1234") to the server device 22, wherein upon authentication, the server device may return a data identifier 24 to the user device 21. In this instance, the data identifier 24 may be a session cookie, and the session cookie may include a session identifier (ID) (e.g., "F7299EBA209CC23").

At this point, an attacker utilizing an attacker device 25 may attempt to access the user's authentication information. In one example, the attacker may access the user's log-in information 23 during transfer of the user's log-in information from the user device 21 to the server device 22. In another example, the attacker may access the data identifier 24 during transfer from the server device 22 to the user device 21.

In other instances, the attacker may access user information directly from the user device 21. Specifically, the attacker may gain access to the user device 21, and may copy the log-in information 23 and/or the user's data identifier 24. At this point, the attacker may use either the user's log-in information 23 or the user's data identifier 24 to impersonate the user on the application, wherein the activity from the attacker's device may appear to come from the victim's device. As a result, the attacker may be able to "blend" their abusive activity with the legitimate activity of the user.

For these reasons, attackers have predictably gone to great lengths to steal data identifiers. Indeed, in some examples, attackers may attempt to gain access to a browser extension having a large userbase, wherein the attackers may thereafter distribute software "updates" that may surreptitiously enable theft of data identifiers from a large numbers of (user) cookie jars. This may be problematic, as this may enable the attackers to access user accounts and resources and utilize them for illicit purposes.

Systems and methods for providing generation and implementation of data identifiers including dynamic elements that may enable detection of compromise of the data identifiers are described. So, in some examples, a "static" data identifier (i.e., a session cookie) may be incorporated (or embedded) with a "dynamic" element (e.g., a counter) that may be incremented with respect to certain activity-related events (i.e., "updates"). That is, the data identifier may be "anchored" via use of the dynamic element, and the changing indicia (e.g., a count) made available by the dynamic element may be utilized to indicate (i.e., "track") compromise of the "static" data identifier. As such, in some examples, where illicit (i.e., compromised) activity may be associated with the "same" data identifier, the systems and methods described may nevertheless utilize the dynamic element to indicate that the manner in which the data identifier may be being utilized may indicate compromise.

In some examples, the systems and methods may implement a dynamic element that may be a counter, wherein the counter may be incorporated (or embedded) into a data identifier (e.g., a session cookie). In some examples, the counter may be incremented based on session-related events, and the incremented count may be "tracked" to evaluate associated activity. So, in some examples and as described further below, if a "tracked" count associated with the counter may fall out of sync with a count associated with a (incoming) session update, the discrepancy may be utilized to infer a possible compromise of the data identifier. Furthermore, in some examples, upon determining a sufficient likelihood that the account may have been compromised, the systems and methods may invalidate the data identifier and require generation of a new data identifier (e.g., via a new log-in by the user).

The systems and methods described herein may be implemented in various contexts. In particular, in some examples, the systems and methods described may be implemented in any context where a data identifier may be used to enable a user to access information or services associated with a computer system. More specifically, the systems and methods may be utilized in any instance where the systems and methods may further implement a dynamic element associated with the data identifier to track activity and detect account compromise. Examples of settings where the systems and methods described may be implemented may include online applications, such as social media platforms, electronic commerce applications and financial service applications.

Figure 6A:
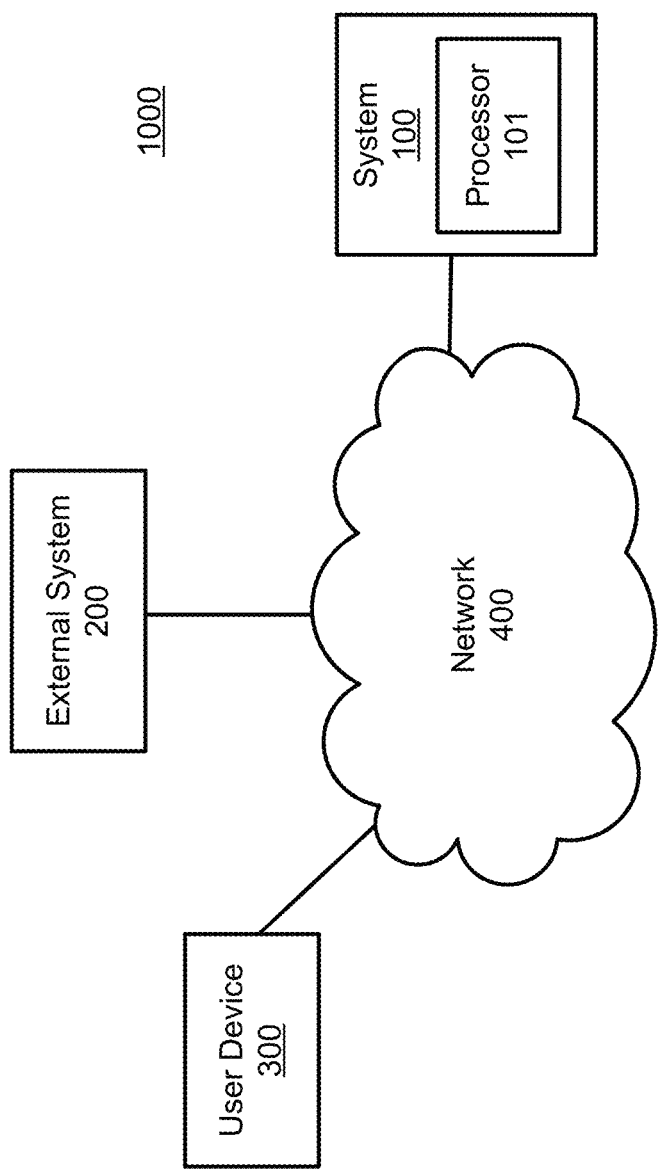
FIG. 6A illustrates a block diagram of a system environment, including a system, that may be implemented to detect account compromise via use of dynamic elements in data identifiers, according to an example.
Figure 6B:
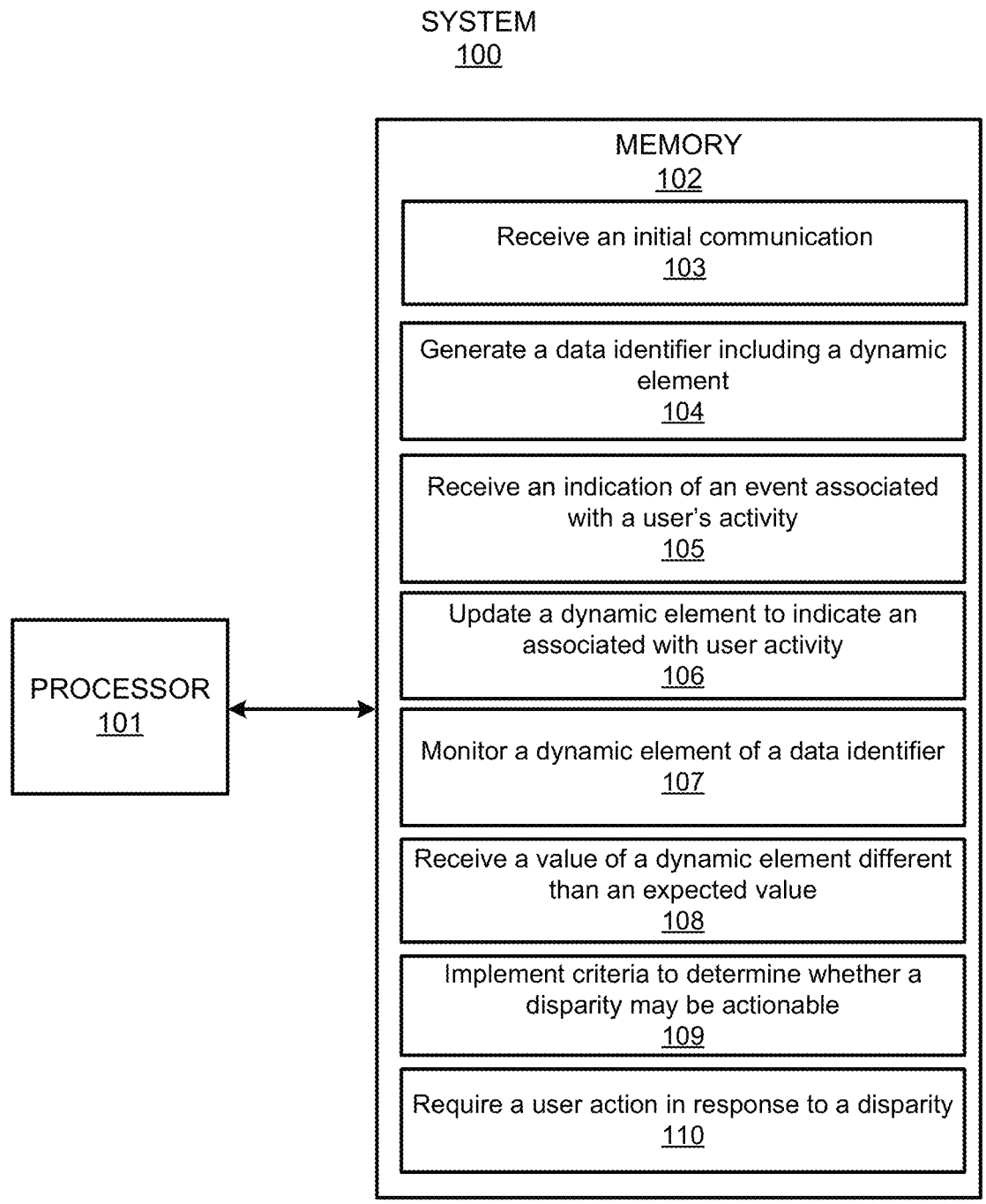
FIG. 6B illustrates a block diagram of the system that may be implemented to detect account compromise via use of dynamic elements in data identifiers, according to an example.
Figure 6C:
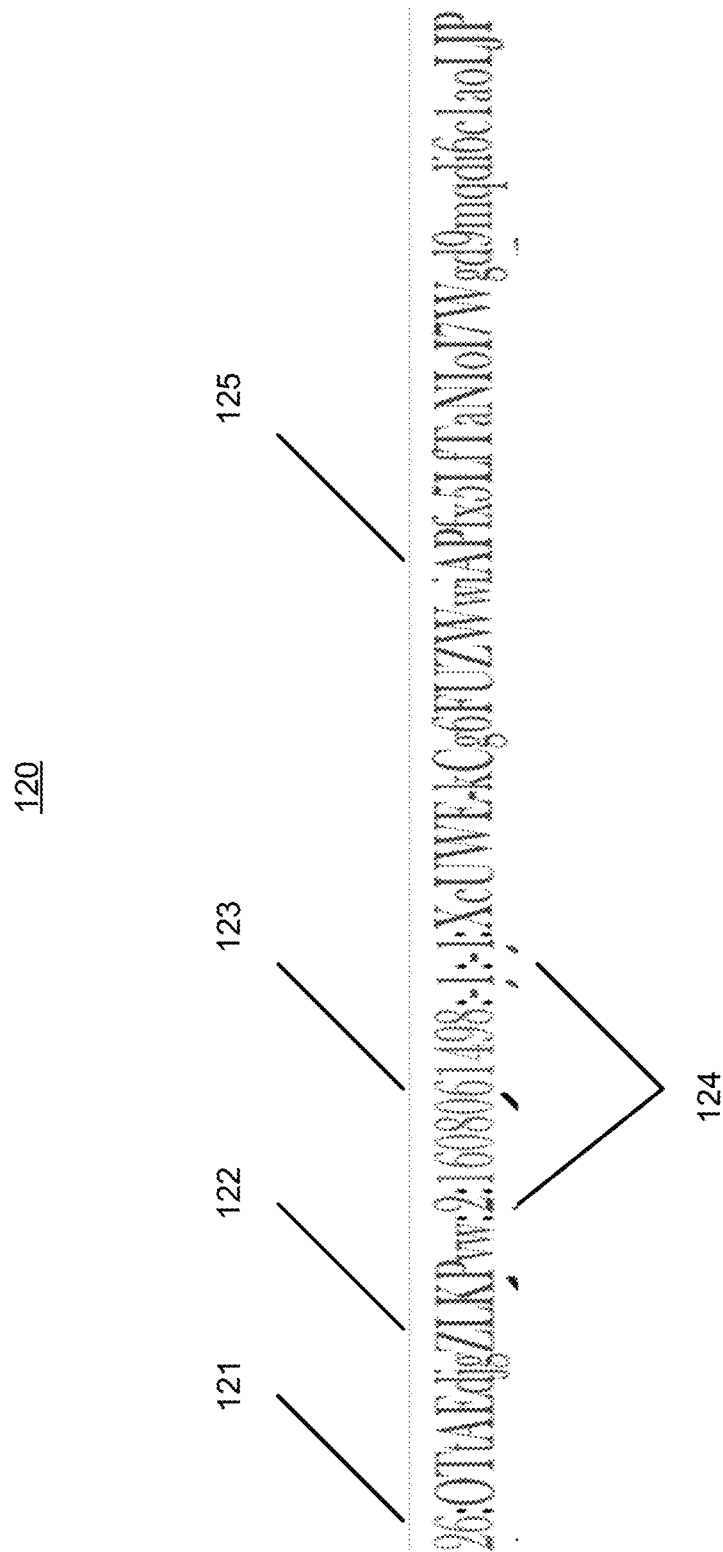
FIG. 6C illustrates an example of a session cookie including a dynamic element, according to an example.

Reference is now made to FIGS. 6A-C. FIG. 6A illustrates a block diagram of a system environment, including a system, that may be implemented to detect account compromise via use of dynamic elements in data identifiers, according to an example. FIG. 6B illustrates a block diagram of the system that may be implemented to detect account compromise via use of dynamic elements in data identifiers, according to an example.

As will be described in the examples below, one or more of system 100, external system 200, user device 300 and system environment 1000 shown in FIGS. 6A-C may be operated by a service provider to detect account compromise. It should be appreciated that one or more of the system 100, the external system 200, the user device 300 and the system environment 1000 depicted in FIGS. 6A-C may be provided as examples. Thus, one or more of the system 100, the external system 200 the user device 300 and the system environment 1000 may or may not include additional features and some of the features described herein may be removed and/or modified without departing from the scopes of the system 100, the external system 200, the user device 300 and the system environment 1000 outlined herein. Moreover, in some examples, the system 100, the external system 200, and/or the user device 300 may be or associated with a social networking system, a content sharing network, an advertisement system, an online system, and/or any other system that facilitates any variety of digital content in personal, social, commercial, financial, and/or enterprise environments.

While the servers, systems, subsystems, and/or other computing devices shown in FIGS. 6A-C may be shown as single components or elements, it should be appreciated that one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100, the external system 200, the user device 300 or the system environment 1000.

It should also be appreciated that the systems and methods described herein may be particularly suited for digital content, but are also applicable to a host of other distributed content or media. These may include, for example, content or media associated with data management platforms, search or recommendation engines, social media, and/or data communications involving communication of potentially personal, private, or sensitive data or information. These and other benefits will be apparent in the descriptions provided herein.

In some examples, the external system 200 may include any number of servers, hosts, systems, and/or databases that store data to be accessed by the system 100, the user device 300, and/or other network elements (not shown) in the system environment 1000. In addition, in some examples, the servers, hosts, systems, and/or databases of the external system 200 may include one or more storage mediums storing any data. In some examples, and as will be discussed further below, the external system 200 may be utilized to store any information (e.g., usernames, passwords, etc.) that may relate to generation and delivery of content. As will be discussed further below, in other examples, the external system 200 may be utilized by a service provider distributing content (e.g., a social media application provider) to provide data identifiers to users of a content platform to enable content browsing (e.g., advertisements).

In some examples, and as will be described in further detail below, the user device 300 may be utilized to, among other things, browse content such as content provided by a content platform (e.g., a social media platform). More particularly, the user device 300 may be configured to receive and utilize a data identifier that may detect account compromise via use of dynamic elements included in the data identifier. In some examples, the user device 300 may be electronic or computing devices configured to transmit and/or receive data. In this regard, each of the user device 300 may be any device having computer functionality, such as a television, a radio, a smartphone, a tablet, a laptop, a watch, a desktop, a server, or other computing or entertainment device or appliance.

In some examples, the user device 300 may be mobile devices that may be communicatively coupled to the network 400 and enabled to interact with various network elements over the network 400. In some examples, the user device 300 may execute an application allowing a user of the user device 300 to interact with various network elements on the network 400. Additionally, the user device 300 may execute a browser or application to enable interaction between the user device 300 and the system 100 via the network 400. In some examples, and as will described further below, a client may utilize the user device 300 to initiate an application session via use of a data identifier that may authenticate the client (user). Moreover, in some examples and as will also be discussed further below, the user device 300 may receive and implement data identifiers including dynamic elements that may enable detection of fraudulent activity associated with the user device 300. In some examples, information relating to the user may be stored and transmitted by the user device 300 to other devices, such as the external system 200.

The system environment 1000 may also include the network 400. In operation, one or more of the system 100, the external system 200 and the user device 300 may communicate with one or more of the other devices via the network 400. The network 400 may be a local area network (LAN), a wide area network (WAN), the Internet, a cellular network, a cable network, a satellite network, or other network that facilitates communication between, the system 100, the external system 200, the user device 300 and/or any other system, component, or device connected to the network 400. The network 400 may further include one, or any number, of the exemplary types of networks mentioned above operating as a stand-alone network or in cooperation with each other. For example, the network 400 may utilize one or more protocols of one or more clients or servers to which they are communicatively coupled. The network 400 may facilitate transmission of data according to a transmission protocol of any of the devices and/or systems in the network 400. Although the network 400 is depicted as a single network in the system environment 1000 of FIG. 6A, it should be appreciated that, in some examples, the network 400 may include a plurality of interconnected networks as well.

It should be appreciated that in some examples, and as will be discussed further below, the system 100 may be configured to utilize various techniques and mechanisms to generate and implement data identifiers comprising dynamic elements that may enable detection of data identifier compromise. Details of the system 100 and its operation within the system environment 1000 will be described in more detail below.

As shown in FIGS. 6A-C, the system 100 may include processor 101, a graphics processor unit (GPU) 101a, and the memory 102. In some examples, the processor 101 may be configured to execute the machine-readable instructions stored in the memory 102. It should be appreciated that the processor 101 may be a semiconductor-based microprocessor, a central processing unit (CPU), an application specific integrated circuit (ASIC), a field-programmable gate array (FPGA), and/or other suitable hardware device.

In some examples, the memory 102 may have stored thereon machine-readable instructions (which may also be termed computer-readable instructions) that the processor 101 may execute. The memory 102 may be an electronic, magnetic, optical, or other physical storage device that contains or stores executable instructions. The memory 102 may be, for example, Random Access memory (RAM), an Electrically Erasable Programmable Read-Only Memory (EEPROM), a storage device, an optical disc, or the like. The memory 102, which may also be referred to as a computer-readable storage medium, may be a non-transitory machine-readable storage medium, where the term "non-transitory" does not encompass transitory propagating signals. It should be appreciated that the memory 102 depicted in FIGS. 6A-C may be provided as an example. Thus, the memory 102 may or may not include additional features, and some of the features described herein may be removed and/or modified without departing from the scope of the memory 102 outlined herein.

It should be appreciated that, and as described further below, the processing performed via the instructions on the memory 102 may or may not be performed, in part or in total, with the aid of other information and data, such as information and data provided by the external system 200 and/or the user device 300. Moreover, and as described further below, it should be appreciated that the processing performed via the instructions on the memory 102 may or may not be performed, in part or in total, with the aid of or in addition to processing provided by other devices, including for example, the external system 200 and/or the user device 300.

In some examples, the memory 102 may store instructions, which when executed by the processor 101, may cause the processor to: receive 103 an initial communication associated with a user session; generate 104 a data identifier including a dynamic element; receive 105 indication of an event associated with a user's activity; and update 106 a dynamic element to indicate the event associated with a user's activity. In addition, the instructions, when executed by the processor 101, may further cause the processor to monitor 107 a dynamic element of a data identifier; receive 108 a value of a dynamic element of a data identifier that may be different than an expected value; implement 109 criteria to determine whether a disparity may be actionable; and require 110 a user action in response to the disparity.

In some examples, and as discussed further below, the instructions 103-110 on the memory 102 may be executed alone or in combination by the processor 101 to detect account compromise via use of dynamic elements in data identifiers. In some examples, the instructions 103-110 may be implemented in association with a content platform configured to provide content for users.

Additionally, although not depicted, it should be appreciated that to detect account compromise via use of dynamic elements in data identifiers, instructions 103-110 may be configured to utilize various artificial intelligence (AI) based machine learning (ML) tools. It should also be appreciated that the system 100 may provide other types of machine learning (ML) approaches, such as reinforcement learning, feature learning, anomaly detection, etc.

In some examples, the instructions 103 may be configured to receive an initial communication associated with a user session. As used herein, an "initial communication" may include any communication associated with providing a computer application. So, in some examples, the initial communication may be associated with a creation of a (new) user session. In particular, in an example where the application may be a social media application, the initial communication may be an attempt by a user to log in to a user account from a user device (e.g., the user device 300). Also, in some examples, upon receipt of the initial communication from the user, the instructions 103 may enable a (new) user session. For example, upon receiving log-in information (e.g., username, password, etc.) from the user, the instructions 103 may initiate a new session.

In some examples, to identify a newly-created user session, the instructions 104 may generate a data identifier associated with the user session. As used herein, a "data identifier" may include any piece (or pieces) of data that may be stored in a computing device and that may be associated with user activity. So, in some examples, the data identifier may be used to authenticate and/or identify an aspect of user activity associated with an application session. In other examples, the data identifier may be used to provide status or archive (i.e., record) information associated with user activity.

In some examples, the data identifier may be a "cookie". In some examples, the cookie may be a piece (or pieces) of data used to "remember" information that the user previously entered into form fields (e.g., names, addresses, etc.). In other examples, the cookie may be used (e.g., by web servers) to indicate whether a user may be logged in or not or which account the user may be logged in with. It should be appreciated that, according to examples provided, features enabled by the instructions on the memory 102 may be associated with and may be implemented by data identifiers of any type and any purpose, including "access tokens", "security tokens" and "device credentials".

So, in some examples, the data identifier may be a "session cookie", wherein the data identifier may be associated with a session, and may be used to identify and/or authenticate aspects of a user session. In other examples, the data identifier may be a "device cookie", wherein the device cookie may be associated with a user device (e.g., the user device 300), an may be used to identify and/or authenticate a user device.

In some examples, the instructions 104 may implement a dynamic element in association with a data identifier. That is, in some examples, the dynamic element may be "added" to the data identifier so as to operate as part of or in conjunction with the data identifier. In some examples, adding the dynamic element to the data identifier may include embedding and/or incorporating the dynamic element. Furthermore, as will be explained further below, since the dynamic element may continuously be updated, this may enable distinguishing between various versions (i.e., copies) of the dynamic element and may provide detection of data identifier compromise.

In some examples, the dynamic element may be an counter. In these examples, and as discussed further below, the counter may be configured to increment according to various criteria. So, in one example, the counter may be configured to increment with and/or according to any and all user activity. In other examples, the counter may increment with only particular types of user activity.

An example of a session cookie 120 is illustrated in FIG. 6C. In this example, the session cookie 120 may include session identifier (ID) 121, a client session covert portion (or "secret") 122, a session creation time 123 and deprecated parts 124. In addition, the session cookie may include a dynamic element 125. In some examples, the session identifier (ID) 121 may identify the current session that the user may be conducting, while the session covert portion 122 may include a cryptographic hash related to authentication information (e.g., log-in and passwords) associated with a current session. Also, in some examples, the session creation time 123 may indicate when the current session was initiated, while the deprecated parts 124 may include portions of the session cookie 10 that are no longer valid or have been replaced. In some examples, the dynamic element 125 may be used to distinguish between various versions (i.e., copies) of the dynamic element and may enable inference of data identifier compromise.

It should be appreciated that, in addition to counters, other forms of dynamic elements may be utilized as well. In one example, a randomly-generated hash may be utilized, wherein the randomly-generated hash may be "played back" to determine if it may be same. Indeed, it should be appreciated that, according to examples provided, features enabled by the memory 102 may be implemented by and with dynamic elements of any type.

Moreover, in some examples, the instructions 104 may implement a dynamic element that may ensure proper transfer of an associated data identifier. In a first example, where the dynamic element (e.g., a counter) may be encrypted, the instructions 104 may implement an encryption technique that may ensure data security and protection. In another example, aspects of a dynamic element may be provided to ensure that a data identifier may be backwards compatible, in that it may be implementable on various versions of an application in use. In a third example, a size of the dynamic element may be selected to ensure proper transfer of an associated data identifier between a system that the instructions 104 may reside on (i.e., the system 100) and a user device (e.g., the user device 300) associated with an application in use. This may include consideration of various factors, including associated transfer formats and usage and demand characteristics. Furthermore, in a fourth example, a dynamic element may be selected to ensure that an associated data identifier may address and/or overcome any application errors (i.e., "bugs") or asynchronous requests that may be associated with transfer between a system that the instructions 104 may be reside on (i.e., the system 100) and a user device associated with an application in use (e.g., the user device 300).

In some examples, the instructions 105 may receive an indication of an event associated with a user's activity. As used herein, an "event" may include any activity or occurrence associated with a user's utilization of an associated application. Also, as used herein, an event may also be interchangeably referred to as an "update" (e.g., a "session update"). Examples that may "trigger" updates as used herein may include a completion of pre-defined periodic time span (e.g., every hour) or an update of an internet protocol (IP) address, a session cookie or a device cookie. Other examples may include an update of a browser version or web-related or content-related requests, such as a user requesting a content item for viewing on a browser application or when a user may provide payment information to conduct an electronic transaction.

In some examples, in addition to receiving an indication of an event associated with a user's activity, the instructions 105 may receive a data identifier as well. In some examples, the data identifier may be received concurrently with the indication of the event, while in other examples, the data identifier may be received at different times.

In some examples, some or all of a data identifier received via the instructions 105 may be encrypted. In some examples, the data identifier may be received from the user's device (e.g., the user device 300), and may include a dynamic element that may provide a status (e.g., a "count") associated with the user's activity. In these instances, the instructions 105 may decrypt some or all of the data identifier to gather information associated with the user's activity and/or to update the data identifier.

In some examples, based on an indication of an event associated with a user's activity (e.g., gathered via the instructions 105), the instructions 106 may update a dynamic element associated with a data identifier. So, in examples where the dynamic element may be a counter, the instructions 106 may increment the counter to indicate (i.e., "mark") the occurrence of the event.

In some examples, the instructions 106 may increment the counter may increment the counter by an increment of one. So, in one example where a counter associated with a session cookie (i.e., the data identifier) may indicate a count of 20,000, the instructions 106 may update the counter by increasing its count by one, to 20,001. In other examples, the instructions 106 may increment the counter by a different amount.

In some examples, upon updating a data identifier in association with a user's activity and prior to transfer (back) to a user device, the instructions 106 may encrypt the updated data identifier as well. It should be appreciated with that the encryption techniques and methods utilized may, in some cases, be unique to a user session. That is, in an instance where a dynamic element of a data identifier may be a counter, an encrypted "value" of data identifier associated with a first session and having a value of 50,000 may appear differently than a data identifier associated with a second session and having the same) value of 50,000.

In some examples, the instructions 106 may store and transmit an updated data identifier (e.g., a session cookie) to an associated user device. So, in an example where a dynamic element of a data identifier may be a counter whose value was updated by one, and instructions 106 may store the updated counter, and may encrypt and then transmit the data identifier with the updated counter to the user device.

In some examples, the instructions 107 may monitor and verify (i.e., "keep track") a value of a dynamic element of a data identifier. In particular, the instructions 107 may monitor progression of a received dynamic element to ensure that the dynamic may be updating in an expected manner and that integrity of the data identifier may not have been compromised. So, in one example where the dynamic element may be a counter, the instructions 107 may monitor the incrementing of the counter to ensure that the counter may be incrementing in an expected manner.

In one example, the instructions 108 may receive a value of a dynamic element of a data identifier that may be different than an expected value. As used herein, a "different than an expected" value (or "unexpected") value of a dynamic element may include a value that may not comport with an expected progression of the dynamic element (e.g., as monitored via the instructions 107). So, in some examples, where a progression of the dynamic element may indicate that a value associated with the data identifier should be X, the instructions 108 may receive in association with a session update a value that may be Y. In this instance, the instructions 108 may, in some examples, determine that a disparity between the expected value and the received value may indicate possible compromise.

In particular, in one example, the instructions 108 may monitor a particular session cookie (i.e., a data identifier) having a stored counter (i.e., a dynamic element) value of 50,000. At this point, the instructions 108 may receive a session update (i.e., a data request of a content item) where an associated session cookie may indicate a counter value of 20,000. Since the received value (i.e., 20,000) may be in disparity with the stored counter value (50,000), the instructions 108 may determine that the disparity may indicate possible compromise of the session cookie. Accordingly, it should be appreciated that the determination may, in some cases, be "agnostic" as to which value may be "correct" or "authentic", and instead may utilize a disparity to infer possible compromise of the data identifier.

In some examples, upon determining a disparity, the instructions 109 may implement techniques and criteria to determine whether the disparity may be actionable. In some instances, a disparity may be the result of innocuous or inadvertent factors. For instance, in some examples, a disparity may be a result of asynchronous data requests that may not be propagating properly to and from an application (e.g., a browser) or browser bugs. In other examples, a disparity may be a result of race conditions (i.e., uncontrollable associated events) or data requests that may be "dropped" during transfer (i.e., "mid-flight"). In these instances, an associated counter gap may constitute a "false positive".

It should be appreciated that, to determine whether a disparity may be actionable, the instructions 109 may consider a variety of factors. Moreover, it should be appreciated that a factor that may be controlling in a first instance may not necessarily be controlling in a second instance. So, for example, in some instances a "large" disparity may be deemed to be innocuous, while in other instances, a "small" disparity may be deemed to actionable. It should also be appreciated that, in some examples, while an identity of a user associated with a data identifier may or may not be considered, where (geographically in the world) an associated request may be coming from may be controlling. Therefore, it should be appreciated that to analyze disparities associated with data identifiers, instructions 109 may be configured to utilize various artificial intelligence (AI) based machine learning (ML) tools.

Furthermore, in some examples, to determine whether a disparity may be actionable, the instructions 109 may implement a set of heuristics. In some examples, the set of heuristics may be based on aspects of internet protocol (IP), and may be utilized to account for disparities resulting from innocuous or inadvertent factors (e.g., browser crashes, bugs, etc.).

In a first example, to determine whether a disparity may be actionable, the instruction 109 may determine if one or more internet protocol (IP) addresses associated with a first event (e.g., a session update) and a second event (e.g. a session update) may be same or similar. That is, in one example, where a first session update may reveal an associated counter value of 50,000 and a second session update may reveal an associated counter value of 20,000, the instructions may determine if the internet protocol (IP) addresses may be the same or similar.

So, in certain examples involving internet protocol (IP) version 4 (i.e., IPv4), the instructions 109 may determine if the addresses may be same or similar, without any modifications. In other instances, such as those involving internet protocol (IP) version 6 (i.e., IPv6), the instructions 109 may "normalize" the one or more addresses, and may determine whether the normalized addresses may be same or similar. In one such instance, to normalize the one or more addresses (e.g., to their 48-bit mask), the instructions 109 may reduce or shorten the internet protocol (IP) version 6 (i.e., IPv6) addresses to a first 48 bits. In another instance, instructions 109 may reduce or shorten the internet protocol (IP) version 6 (i.e., IPv6) addresses may be reduced to a first 64 bits. It should be appreciated that, in general, an internet protocol (IP) version 6 (i.e., IPv6) address masked to first 48 or 64 bits may be equivalent to an unchanged internet protocol (IP) version 4 (i.e., IPv4) address. In such instances, a disparity associated a dynamic element of a data identifier may be deemed benign. In other instances, where they may not be same, the instructions 109 may determine a disparity may be actionable.

In some examples, to determine whether a disparity may be actionable, the instruction 109 may determine if an autonomous system number (ASN) associated with a first session update and an autonomous system number (ASN) associated with a second session update may be same. However, in an instance where they may be same, the instructions 109 may further determine if the autonomous system number(s) (ASNs) may be "high-risk". So, in some examples, determining if an autonomous system number(s) (ASNs) may be "high-risk" may include consulting a list of "high-risk" autonomous system number(s) (ASNs). In one example, a high-risk autonomous system number (ASN) may include an ASN responsible for twenty percent (20%) or more of a country's logged-in users of a content platform. If the autonomous system number(s) (ASNs) may be same and also may not be deemed "high-risk", the determination may proceed (e.g., to another security criteria). However, if the autonomous system number(s) (ASNs) may be same and also may be deemed "high-risk", the instructions 109 may determine if there may be an associated netblock. As used herein, a "netblock" may include a range of consecutive internet protocol (IP) addresses. So, in one such example, for a sample IPv4 191.168.0.1, a netblock may be any IPv4 of form 191.168.0."X" that may match. In these instances, if the instructions 109 may determine that the netblocks may match (i.e., be same or similar), the disparity may be deemed benign and/or the determination may proceed (e.g., to another security criteria).

In some examples, to determine whether a disparity may be actionable, the instructions 109 may further implement a user agent check. As used herein, a "user agent" may include any software that may act on behalf of a user to retrieve, render and/or facilitate interaction with web content. So, in some examples, if a browser version utilized may remain same and did not downgrade (i.e., a second session update may be associated with an application version that's not older than an application version that a first session update where a maximum counter value was set may be associated with), then the instructions 109 may deem the data identifier as not compromised and may mark the request as benign. However, if the browser did change or if the browser may be an older version, a disparity may be deemed to be actionable in some examples.

In some examples, the instructions 109 may implement various other verification features as well. In some examples, the instructions 109 may identify and exclude consideration of endpoints that may be prone to dropping cookie writes. In addition, the instructions 109 may implement database-locking mechanisms that may disregard requests that may be issued closely together, and thereby likely to cause false positives. Furthermore, in some examples, the instructions 109 may receive an incremented counter value from a user device (e.g., the user device 300), wherein an associated application (e.g., a mobile device application) may enable a incrementing counter located on the user device.

Moreover, in some examples, the instructions 109 may be sent a server-time along with a sent request as well. So, in these examples, an associated application on a user device (e.g., the user device 300) may receive and store the server-time, and may send it back with each request. In these instances, even if a disparity may exist, if the server-time sent and received are the same the disparity is likely to be a false-positive.

In other instances, to offer remediation against race conditions, the instructions 109 may not update a dynamic element if a server-side object may have changed during an associated request. As a result, in some instances. In still other instances, the instructions 109 may not update a dynamic element if the dynamic element may have previously already been updated within a predetermined period of time (e.g., one minute).

In some examples, upon inferring and/or determining that a data identifier may have been compromised, the instructions 110 may require a user to utilize another (new) data identifier. So, in some examples, this may include requiring a user to log-in again into an associated application. That is, in some examples, upon determining a sufficient likelihood that a data identifier may have been compromised, the instructions 110 may invalidate the (likely compromised) data identifier, and may require generation of a new data identifier (e.g., via a new log-in by the user).

FIG. 7 illustrates a block diagram of a computer system for customized outreach plan generation and optimization based on virtual structures, according to an example. In some examples, the system 4000 may be associated the system 100 to perform the functions and features described herein. The system 4000 may include, among other things, an interconnect 410, a processor 412, a multimedia adapter 414, a network interface 416, a system memory 418, and a storage adapter 420.

The interconnect 410 may interconnect various subsystems, elements, and/or components of the external system 400. As shown, the interconnect 410 may be an abstraction that may represent any one or more separate physical buses, point-to-point connections, or both, connected by appropriate bridges, adapters, or controllers. In some examples, the interconnect 410 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 410 may allow data communication between the processor 412 and system memory 418, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 412 may be the central processing unit (CPU) of the computing device and may control overall operation of the computing device. In some examples, the processor 412 may accomplish this by executing software or firmware stored in system memory 418 or other data via the storage adapter 420. The processor 412 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 414 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 416 may provide the computing device with an ability to communicate with a variety of remote devices over a network (e.g., network 400 of FIG. 4A) and may include, for example, an Ethernet adapter, a Fibre Channel adapter, and/or other wired- or wireless-enabled adapter. The network interface 416 may provide a direct or indirect connection from one network element to another, and facilitate communication and between various network elements.

The storage adapter 420 may connect to a standard computer-readable medium for storage and/or retrieval of information, such as a fixed disk drive (internal or external).

Many other devices, components, elements, or subsystems (not shown) may be connected in a similar manner to the interconnect 410 or via a network (e.g., network 400 of FIG. 4A). Conversely, all of the devices shown in FIG. 7 need not be present to practice the present disclosure. The devices and subsystems can be interconnected in different ways from that shown in FIG. 7. Code to implement the dynamic approaches for payment gateway selection and payment transaction processing of the present disclosure may be stored in computer-readable storage media such as one or more of system memory 418 or other storage. Code to implement the dynamic approaches for payment gateway selection and payment transaction processing of the present disclosure may also be received via one or more interfaces and stored in memory. The operating system provided on system 100 may be MS-DOS, MS-WINDOWS, OS/2, OS X, IOS, ANDROID, UNIX, Linux, or another operating system.

Figure 8:
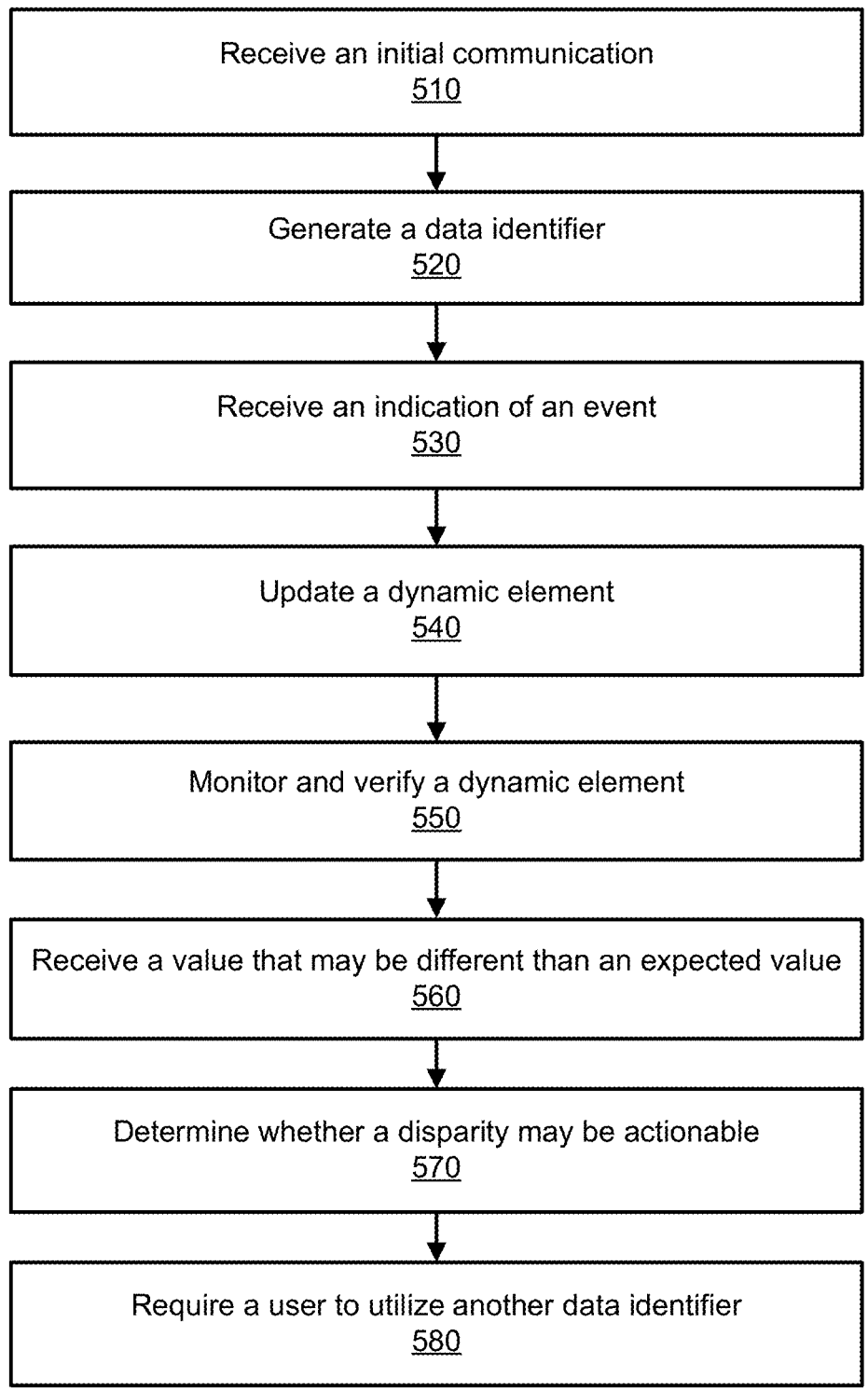
FIG. 8 illustrates a method for detecting account compromise via use of dynamic elements in data identifiers, according to an example.

FIG. 8 illustrates a method 500 for generating and delivering content to a user via remote rendering and real-time streaming, according to an example. The method 500 is provided by way of example, as there may be a variety of ways to carry out the method described herein. Each block shown in FIG. 8 may further represent one or more processes, methods, or subroutines, and one or more of the blocks may include machine-readable instructions stored on a non-transitory computer-readable medium and executed by a processor or other type of processing circuit to perform one or more operations described herein.

Although the method 500 is primarily described as being performed by system 100 as shown in FIGS. 6A-B, the method 500 may be executed or otherwise performed by other systems, or a combination of systems. It should be appreciated that, in some examples, the method 500 may be configured to incorporate artificial intelligence (AI) or deep learning techniques, as described above. It should also be appreciated that, in some examples, the method 500 may be implemented in conjunction with a content platform (e.g., a social media platform) to generate and deliver content to a user via remote rendering and real-time streaming.

Reference is now made with respect to FIG. 5. At 510, the processor 101 may receive an initial communication associated with a creation of a (new) user session. So, upon receiving log-in information (e.g., username, password, etc.) from the user, the processor 101 may initiate a new session.

At 520, the processor 101 may generate a data identifier including a dynamic element, wherein the data identifier may be used to authenticate and/or identify an aspect of user activity associated with an application session. In other examples, the processor 101 may utilize the data identifier to provide status or archive (i.e., record) information associated with user activity. In addition, the processor 101 may implement a dynamic element in association with a data identifier. Also, in some examples, since the dynamic element may continuously be updated, this may enable distinguishing between various versions (i.e., copies) of the dynamic element and may provide detection of data identifier compromise.

At 530, the processor 101 may receive an indication of an event associated with a user's activity. In this example, the event may be a periodic (e.g., every hour) update of an internet protocol (IP) address, a session cookie or a device cookie.

At 540, the processor 101 may update a dynamic element to indicate an event associated with a user's activity. So, in examples where the dynamic element may be a counter, the processor 101 may increment the counter to indicate (i.e., "mark") the occurrence of the event. In one example, the processor 101 may increment the counter may increment the counter by an increment of one.

At 550, the processor 101 may monitor and verify a value of a dynamic element of a data identifier. In particular, the processor 101 may monitor progression of a received dynamic element to ensure that the dynamic element may be updating in an expected manner and that integrity of the data identifier may not have been compromised.

At 560, the processor 101 receive a value of a dynamic element of a data identifier that may be different than an expected value. So, in some examples, where a progression of the dynamic element may indicate that a value associated with the data identifier should be X, the processor 101 may receive in association with a session update a value that may be Y. In this instance, the processor 101 may determine that a disparity between the expected value and the received value may indicate possible compromise.

At 570, the processor 101 may implement techniques and criteria to determine whether a disparity may be actionable. In some examples, the processor 101 may implement a set of heuristics. These heuristics may include comparing internet protocol (IP) addresses associated with a first event (e.g., a session update) and a second event (e.g. a session update), determining if an autonomous system number (ASN) associated with a first session update and an autonomous system number (ASN) associated with a second session update may be same, and implementing a user agent check.

At 580, the processor 101 may require a user to utilize another (new) data identifier. In some examples, upon determining a sufficient likelihood that a data identifier may have been compromised, the processor 101 may invalidate the (likely compromised) data identifier, and may require generation of a new data identifier (e.g., via a new log-in by the user).

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

As mentioned above, content delivery networks (CDNs) may be used for the quick transfer of assets across the internet. A properly configured content delivery network (CDN) may also secure the content and protect websites against common malicious attacks. Various mechanisms may be implemented to improve the security of content on content delivery network (CDN) servers. For example, a rogue user may leak sensitive content by sharing a content delivery network (CDN) link so that all unencrypted content faces the threat of being exposed outside of the respective instance. This may even happen innocently or inadvertently by sharing a content delivery network (CDN) link with various parties. In either case, content that is encrypted (such as content under Digital Rights Management (DRM)), however, may still be accessible to users within an organization who are not authenticated to access the encrypted content via the content delivery network (CDN) link. Various solutions may be implemented to secure such content on the content delivery network (CDN) servers.

One mechanism to secure the content delivery network (CDN) servers may include maintaining user authentication details on the content delivery network (CDN) servers. This may require the content delivery network (CDN) server to place cookies on users' browsers while serving content and to hold the session information. However, this is not traditionally a content delivery network (CDN) function as content delivery network (CDNs) are typically meant to serve low latency media content to a user from a geographical proximate location. As a result, storing the user information and requiring content delivery network (CDNs) to hold sessions may involve transferring a web server functionality to a content delivery network (CDN) which may be infeasible or inefficient. A second approach may provide for reusing a www user session cookie to avoid maintaining a separate cookie. In this methodology, the content delivery network (CDN) domain may still need to maintain user sessions or rely on the internet to validate the user for each request. A risk of leaking the cookie and thereby compromising the user on the internet may also exist. A third approach may include a "look-aside" authentication which may require authenticating the user on the internet domain and trusting the user on the content delivery network (CDN) domain upon all subsequent requests until expiry, at which point the user may need to be authenticated again. Various limitations, however, may exist for this approach. With third-party cookies being increasingly blocked on different browsers, there may not be an option for the form POST to obtain cookies from the internet domain and drop the cookie on the content delivery network (CDN) domain. An alternative approach may include passing cookies through signed GETs at the top level. However, if a timeline has 10 posts with media files, it may require one top-level redirect through GETs to set the cookie (upon expiry). Reloading the entire page to set a cookie on the content delivery network (CDN) domain may lead to a suboptimal user experience with very high maintenance. This method may also require different solutions for browsers and mobile apps. Yet another issue to be addressed in this approach may include third-party cookie blocking. The internet (or www protocols) authenticates a user by verifying cookies (from a client) against the session on a server. Given storing session info at a content delivery network (CDN) is an overhead, the only two pieces of info that may be verified upon a request are a cookie and some identifier in the Universal Resource Locator (URL) itself. But with the third-party cookies being blocked, practically no scope exists to verify the user on a content delivery network (CDN).

New and novel mechanisms are described herein to secure content on a content delivery network (CDN) that mitigate or obviate the problems of the various conventional methods and approaches discussed above. Generally, the URLs to access content delivery network (CDN) content may be configured to be un-guessable making them hard to discover. However, such URLs may still be discovered within a set expiry period even if accessed by un-authenticated parties. Therefore, mechanisms are proposed herein with shortened URL expiry, allowing redirects from a content delivery network (CDN) to the internet domain on URL expiry, authenticating the user and validating against privacy policies on the content, generating a fresh content delivery network (CDN) URL (with new expiry), and redirecting the user back to the content delivery network (CDN) to serve content.

Another approach to secure content delivery network (CDNs) may include configuring URLs with short expiry without privacy checks on the webserver. Privacy checks are a function executed on a viewer against the content. So long as the function, viewer, and content remain unchanged, the output i.e., pass/fail would remain the same. Therefore, it may be reasonably assumed that to make the function (i.e., a privacy rule) would not be fast-moving to be a real threat. Hence, once a user is validated against privacy checks and allowed to access content on the content delivery network (CDN), the mechanism to secure content delivery network (CDN) content may generate a unique identifier for the logged-in user and include the unique identifier in the content delivery network (CDN) URL. Such a unique identifier may represent the view for which the content delivery network (CDN) URL is generated. Therefore, it may be possible to have a shorted URL expiry, allow redirect from content delivery network (CDN) to the web server upon expiry, authenticate the user and validate the current user against the identifier in the content delivery network (CDN) URL, generate fresh content delivery network (CDN) URL (with new expiry), and to redirect the user back to the content delivery network (CDN) to serve content. Signing a content delivery network (CDN) URL may prevent a malicious user from generating a content delivery network (CDN) link for a content item #1 and using their identifier to try and access content item #2 on the content delivery network (CDN) in the same session.

Figure 9A:
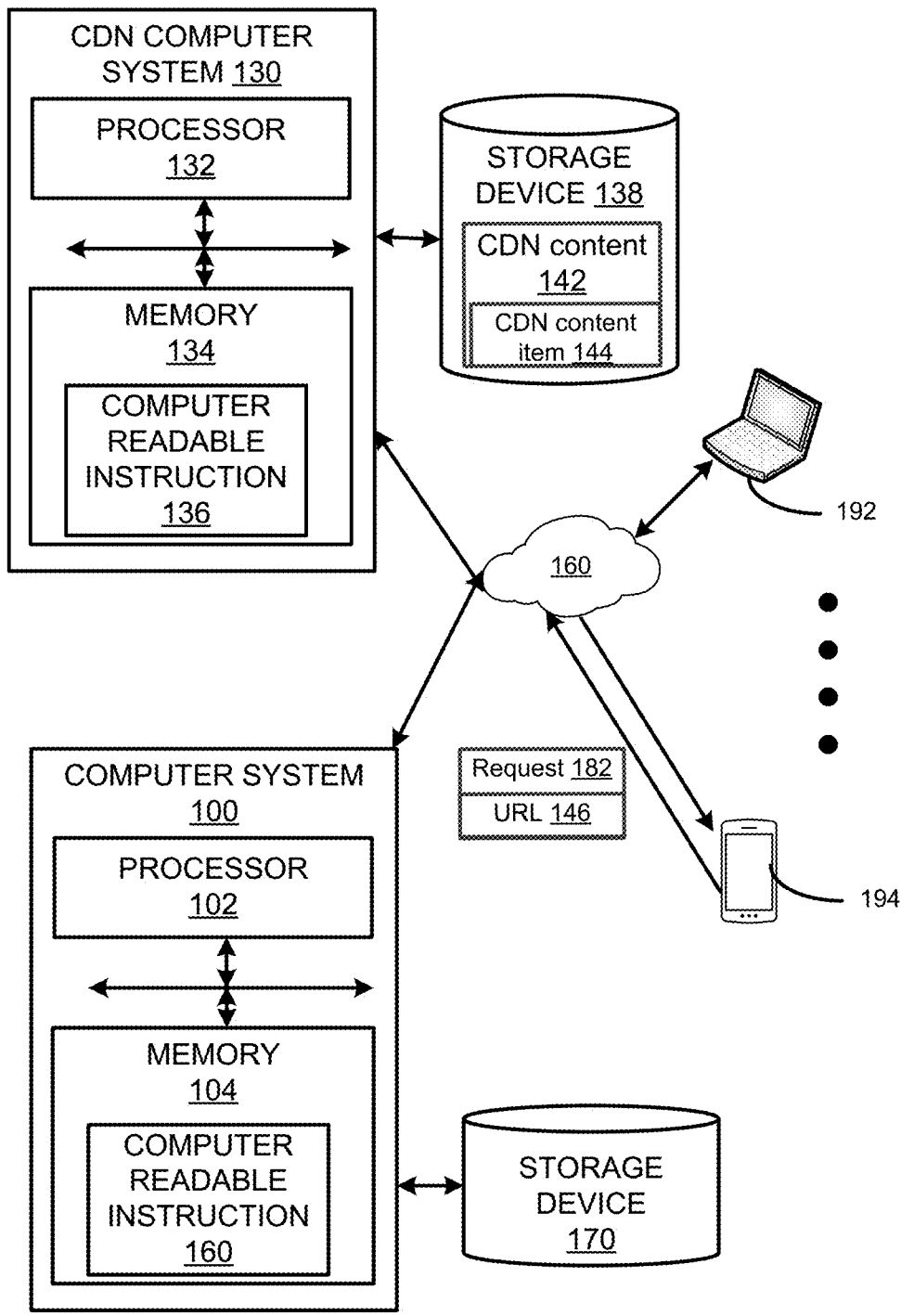
FIG. 9A illustrates a block diagram of a computer system used for securing access to the content of a content delivery network (CDN), according to an example.
Figure 9B:
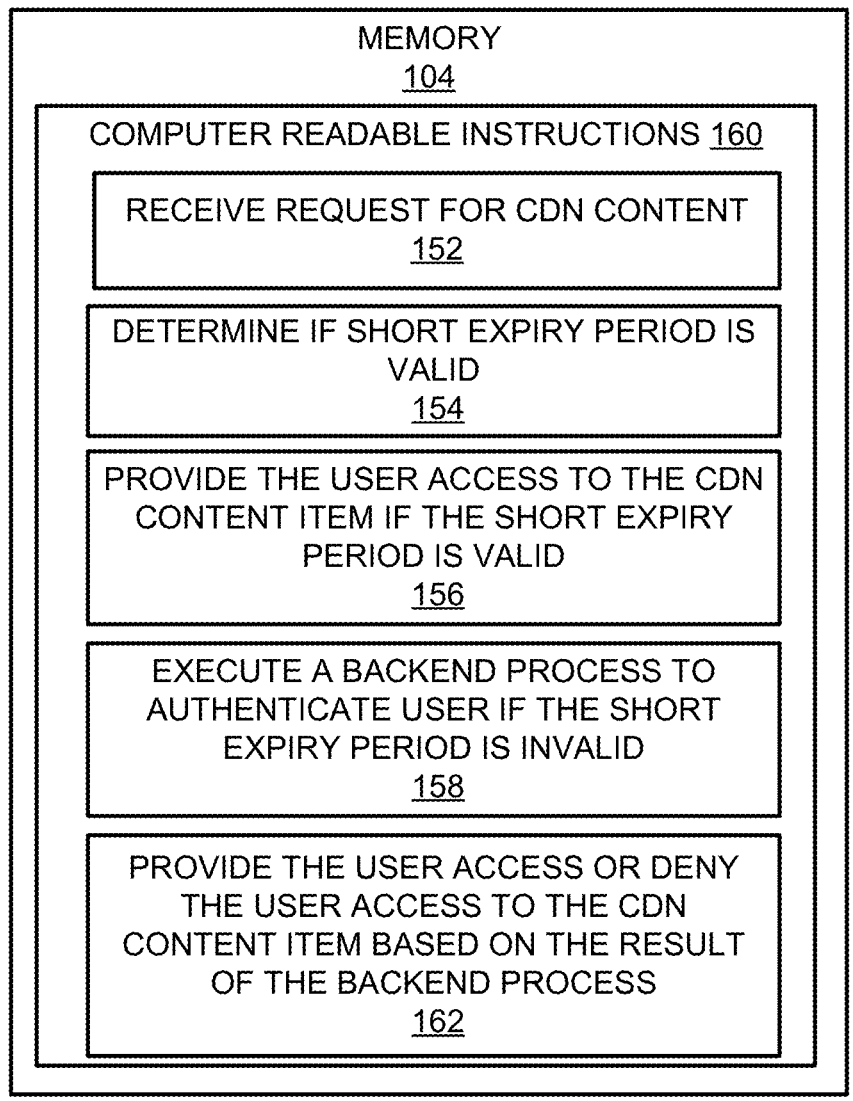
FIG. 9B illustrates a block diagram of a memory included in the computer system used for securing content access on the content delivery network (CDN), according to an example.

Reference is now made with respect to FIGS. 9A and 9B which illustrate a block diagram of a computer system 100 and a memory 104 included therein that is used for providing secure access to the content of a content delivery network (CDN) according to an example. As shown in FIG. 9A the computer system 100 may include a processor 102 and a memory 104. FIG. 9B illustrates a block diagram of the memory 104 including computer-readable instructions 160, that when executed by the processor 102 may be configured to provide secured access to the content of the content delivery network (CDN) over user communications devices 192, 194 . . . , etc., according to an example. As mentioned above, a content delivery network (CDN) may include a group of geographically distributed computer systems providing access to different types of content. Accordingly, the content delivery network (CDN) being accessed by the computer system 100 may be represented by the content delivery network (CDN) computer system 130 which may be geographically proximate to the user devices 192, 194, etc. The content delivery network (CDN) computer system 130 may include a processor 132, a memory 134 including computer-readable instructions 136. The content delivery network (CDN) computer system 1390 may be communicatively coupled to a storage device 138 which may be used to store the different types of content.

The user communication devices 192, 194 . . . , etc. may be electronic or computing devices configured to transmit and/or receive data (e.g., via a social media application), and in one example, the user communication devices 192,

194 ..., etc., may include a smartphone, a laptop, a smartwatch, an Augmented RealityNirtual Reality (ARNR) device. The computer system 100 may also be connected to the content delivery network (CDN) 130 which may store different types of content i.e., the content delivery network (CDN) content 142 such as but not limited to, documents, voice files, images, videos, etc. In an example, the content delivery network (CDN) computer system 130 may be connected to a plurality of similar computer systems that service content requests from user devices in their proximate geographic areas. When a content request is received at the computer system 100 from a geographically proximate user device e.g., the user device 194 then the content delivery network (CDN) computer system 130 may be activated to provide a link to the requested content item.

In an example, the computer system 100 may function as a web server that provides access to the content delivery network (CDN) content 142 upon proper authorization and authentication of the users. In an example, when a user loads a webpage or a social media post that includes a content item (e.g., an image) from the content delivery network (CDN) computer system 130, a URL to the content item may be provided in the webpage and the content item may be loaded only if it is determined by the computer system 100 that the user is authorized and properly authenticated as detailed herein.

The computer system 100 may communicate with the user communication devices 192, 194, ... etc., and the content delivery network (CDN) computer system 130 via a network 160 that can be a local area network (LAN), a wide area network (WAN), the Internet, a cellular network, a cable network, a satellite network, or another network. Network 160 may further include one, or any number, of the exemplary types of networks mentioned above operating as a stand-alone network or in cooperation with each other. For example, the network 160 may utilize one or more protocols of one or more clients or servers to which they are communicatively coupled. Network 160 may facilitate the transmission of data according to a transmission protocol of any of the devices and/or systems in the network 160. Although network 160 is depicted as a single network, it should be appreciated that, in some examples, the network 160 may include a plurality of interconnected networks as well.

It should be appreciated that the systems and subsystems shown and described herein, may include one or more servers or computing devices. Each of these servers or computing devices may further include a platform and at least one application. An application may include software (e.g., machine-readable instructions) stored on a non-transitory computer-readable medium and executable by a processor. A platform may be an environment on which an application is designed to run. For example, a platform may include hardware to execute the application, an operating system (OS), and runtime libraries. The application may be compiled to run on the platform. The runtime libraries may include low-level routines or subroutines called by the application to invoke some behaviors, such as exception handling, memory management, etc., of the platform at runtime. A subsystem may be similar to a platform and may include software and hardware to run various software or applications.

While the servers, systems, subsystems, and/or other computing devices may be shown as single components or elements, it should be appreciated that one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the computer system 100 or the system environment including the computer system 100, the user communication devices 192, ... etc., and the plurality of data sources 120.

The computer system 100 may further include the storage device 170. In one example, the storage device 170 may include any number of servers, hosts, systems, and/or databases that store data to be accessed by the computer system 100 or other systems (not shown) that may be communicatively coupled thereto. Also, in one example, the servers, hosts, systems, and/or databases of the storage device 170 may include one or more storage mediums storing any data, and may be utilized to store information (e.g., user authorization information) relating to users of a social media application facilitating the transmission of the content delivery network (CDN) content 142.

The processor 102 in the computer system 100 accesses the computer-readable instructions 160 from the memory 104 to execute various processes that enable verifying user credentials and providing access to the content delivery network (CDN) content 142 to authorized and authenticated users as described herein. In one example, the memory 104 may have stored thereon machine-readable instructions (which may also be termed computer-readable instructions) that the processor 102 may execute. The memory 104 may be an electronic, magnetic, optical, or another physical storage device that contains or stores executable instructions. The memory 104 may be, for example, Random Access Memory (RAM), an Electrically Erasable Programmable Read-Only Memory (EEPROM), a storage device, an optical disc, or the like. The memory 104, which may also be referred to as a computer-readable storage medium, may be a non-transitory machine-readable storage medium, where the term "non-transitory" does not encompass transitory propagating signals.

Similarly, the processor 132 in the content delivery network (CDN) computer system 130 may access the computer-readable instructions 136 from the memory 134 to execute various processes that enable providing access to the content delivery network (CDN) content 142 to authorized and authenticated users as described herein. In one example, the memory 134 may have stored thereon machine-readable instructions (which may also be termed computer-readable instructions) that the processor 132 may execute. The memory 134 may be an electronic, magnetic, optical, or another physical storage device that contains or stores executable instructions. The memory 134 may be, for example, Random Access Memory (RAM), an Electrically Erasable Programmable Read-Only Memory (EEPROM), a storage device, an optical disc, or the like. The memory 134, which may also be referred to as a computer-readable storage medium, may be a non-transitory machine-readable storage medium, where the term "non-transitory" does not encompass transitory propagating signals.

More particularly, the processor 102 may execute instructions 152 to receive a request 182 for the content delivery network (CDN) content 142, for example, from the user device 194. The request 182 may be received when it is automatically generated at the user device 194 when a web page is loaded, when a blog post is accessed, or when a social media post is selected for viewing by the user, etc. In an example, the web page/blog post/social media post may include a URL 146 to a specific content item 144 of the content delivery network (CDN) content 142, and when the webpage is loaded or the blog post is accessed, the information regarding the URL 146 may be transmitted back to the computer system 100 as part of the request 182. The URL 146 may be configured with different expiry periods according to some examples. The expiry periods may include a long expiry period (e.g., about 30 days) and a short expiry period (e.g., about 5 minutes). In addition, the URL 146 may include identification regarding a user for whom the URL 146 is generated and the content item 144 that the URL 146 is linked to.

The processor 102 may execute instructions 154 to determine if the short expiry period is valid based at least on one of the parameters of the URL 146. If it is determined that the request 182 is received within the short expiry period, the processor 102 may execute instructions 156 to provide access to the content delivery network (CDN) content item 144 to the user device 194.

If it is determined that the short expiry period is invalid (e.g., if the request 182 was received more than 5 minutes after the URL 146 was generated where the short expiry period=5 minutes), then the processor 102 may execute instructions 158 to execute a backend process that may determine if the long expiry period is valid and if the user is authenticated to access the content delivery network (CDN) content item 144.

Based on the result of the backend process at the computer system 100, the processor 102 may execute instructions 162 to provide access or deny access to the user to the content delivery network (CDN) content item 144. If the user is determined to be an authentic user, the backend process may be deemed to be a success and the user may be allowed to access the content delivery network (CDN) content item 144 via a refreshed URL as detailed further herein. If the user cannot be confirmed as an authentic user or if the long expiry period has elapsed, the backend process may be deemed to be a failure and the user may be denied access to the content delivery network (CDN) content item 144.

The access procedure described above introduces a two-stage expiry window. During the short expiry period, the URL may be valid for the user whom it is made and may display the content delivery network (CDN) content item 144. Between the short and long expiry period (i.e., when the short expiry period lapses but during the long expiry period), the URL 146 itself may be valid but requesting the content delivery network (CDN) content item 144 may result in a redirect message and a user authentication challenge may be presented as part of the backend process to verify that the authentic user is requesting the content delivery network (CDN) content. After that check, a new URL may be issued and the resource is loaded. After the long expiry period, the URL 146 becomes invalid and the browser may display a request rejected message. The addition of three new URL parameters (oe2, uss, odm) enables the implementation of the two-stage expiry window. Architecturally, the additions in the setup described herein are the infrastructural efficiencies on the webserver side to allow a substantial reduction in validity followed by the session check and the URL refresh capabilities. In the various URL arguments, 'oh' may be a hashed signature, 'oe' may be a hex-coded UNIX timestamp to indicate the short expiry period, 'oe2' may be a hex-coded UNIX timestamp to represent the long expiry period (which may be about 720 hours by default), 'Liss' may be a hashed value of a temporary unique identifier (rotating TPID) for the specific user and optionally the content ID that allows checking whether the same individual is requesting the resource and 'odm' may be a dynamic domain value (e.g., "domainvalue.com") used in the URL refresh.

Figure 10:
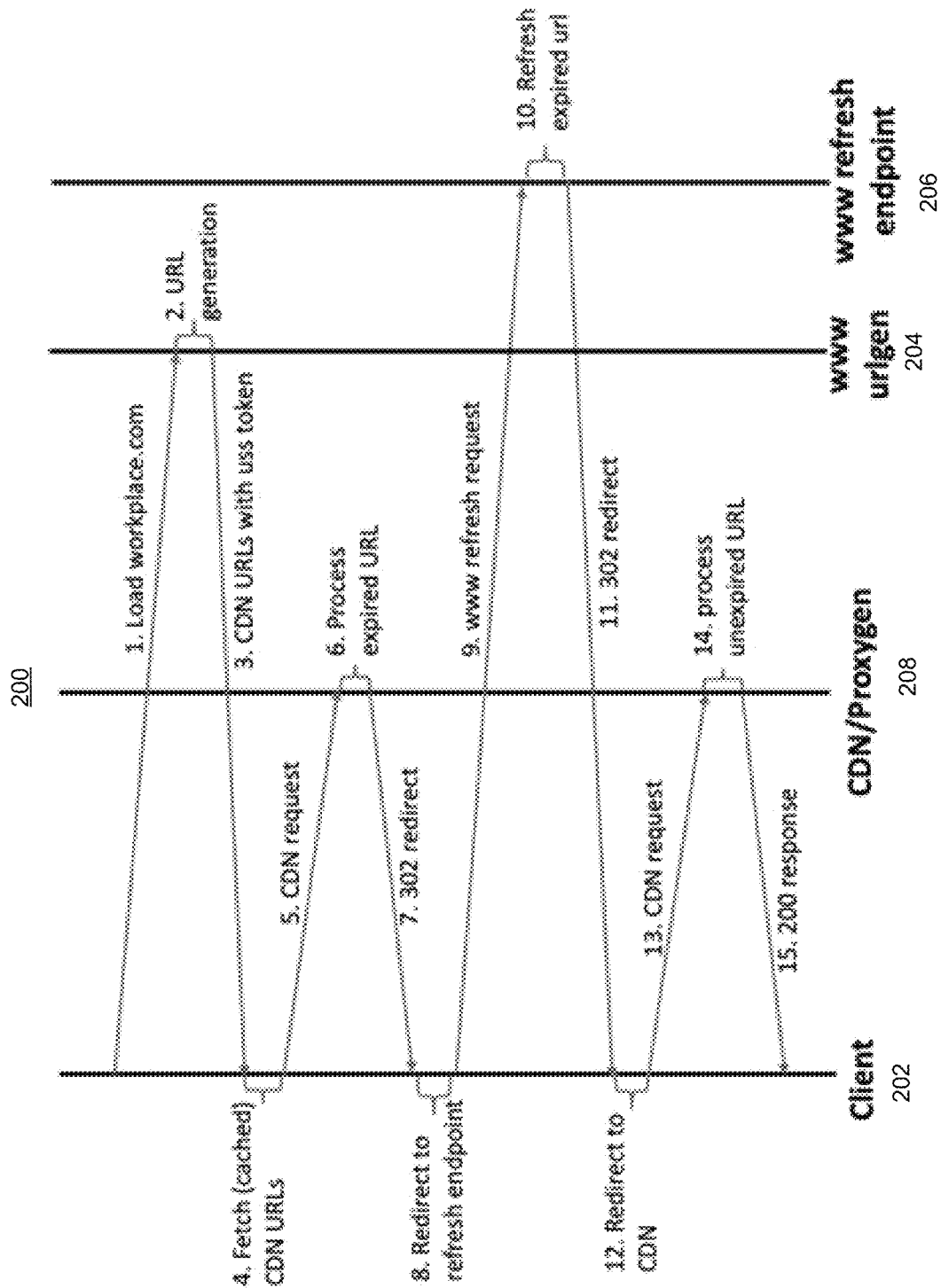
FIG. 10 shows different steps in the content delivery network (CDN) time-limited token authentication process according to an example.

FIG. 10 shows different steps in the content delivery network (CDN) time-limited token authentication process 200 according to an example. At step 1, the client/user 202 may access a domain using a browser such as by loading a webpage of the domain (e.g., 'domain.com'). Although www urlgen 204 and www refresh endpoint 206 are shown separately it may be appreciated that the computer system 100 may host either or both the components while the content delivery network (CDN)/Proxygen 208 refers to the content delivery network (CDN) computer system 130. If the webpage includes an asset (e.g., an image) from the content delivery network (CDN) computer system 130, i.e., the content delivery network (CDN) content item 144, step 2 may be executed to generate a URL 146 that enables the client 202 access to the content delivery network (CDN) content item 144. In an example, the URL 146 may be generated at the computer system 100 by a www URLgen 204 module. It should be appreciated that a code module may not necessarily be a separate server. In some examples, both www urlgen and www refresh endpoint may be code module which live in www, where www may be a service (e.g., group of servers). In an example, the URL 146 may be generated with the various arguments as detailed above including the two expiry parameters—the URL expiry time (oe), the refresh expiry time (oe2), and the uss token. The URL 146 including the uss token may be provided to the client 202 at step 3. At step 4, the URL 146 may be fetched (or cached) at the client 202, and when the client 202 loads the webpage a request for the content delivery network (CDN) content item 144 may be transmitted to the content delivery network (CDN) computer system 130 via the URL 146. The content delivery network (CDN) computer system 130 or the content delivery network (CDN)/proxygen 208 may determine that the short expiry period has lapsed and hence, the client 202 may be redirected at step 7. A redirect message may not typically be displayed at the client 202 at step 8. The user may transparently follow the redirect message and send a refresh request to the www refresh endpoint 206 at step 9. At step 10, multiple checks may be conducted at the www refresh endpoint 206. Initially, it is determined if the long expiry period is valid i.e., the oe2 expiry check. If it is determined that the long expiry period is invalid or has elapsed, the client's request for content access is rejected.

If the long expiry period is valid, it may be further determined if the user is authenticated via checking the user token from the 'uss' URL argument that may include a hashed value of a rotating TPID for the specific user. More particularly, the user token from the 'uss' may be compared with the user identifying info associated with the user session of the refresh request i.e., the same session check on the uss token. If it is determined on the comparison that the tokens differ from each other, the user's request for content access may be rejected as the user is identified as an unauthenticated user. If the TPID of the user from the URL 146 matches the user data from the refresh session, the client 202 may receive a redirect message with the refreshed content delivery network (CDN) URL at step 11. At step 12, the client 202 receives the refreshed URL and may be transparently redirected to the content delivery network (CDN)/Proxygen 208 at step 13. At step 14, the refreshed URL may be checked for validity at the content delivery network (CDN)/Proxygen 208 and the client 202 may be provided access to the content delivery network (CDN) resource at step 15 by the content delivery network (CDN)/Proxygen 208. The steps of the authorization and authentication process described above may be applied to content delivery network (CDN) content including images and progressive video. In the normal usage workflow, the content delivery network (CDN) URL may be consumed immediately after it is created so that the URL age when it is consumed may be quite low e.g., p90=27 seconds for browsers. So the multiple round trip times (RTTs) cause by URL expiry and refresh are rarely activated for normal usage. However, when content delivery network (CDN) URL is leaked, the URL becomes stale and the URL refresh operation may fail due to the short expiry period mechanism thereby effectively preventing resource leakage.

Figure 11:
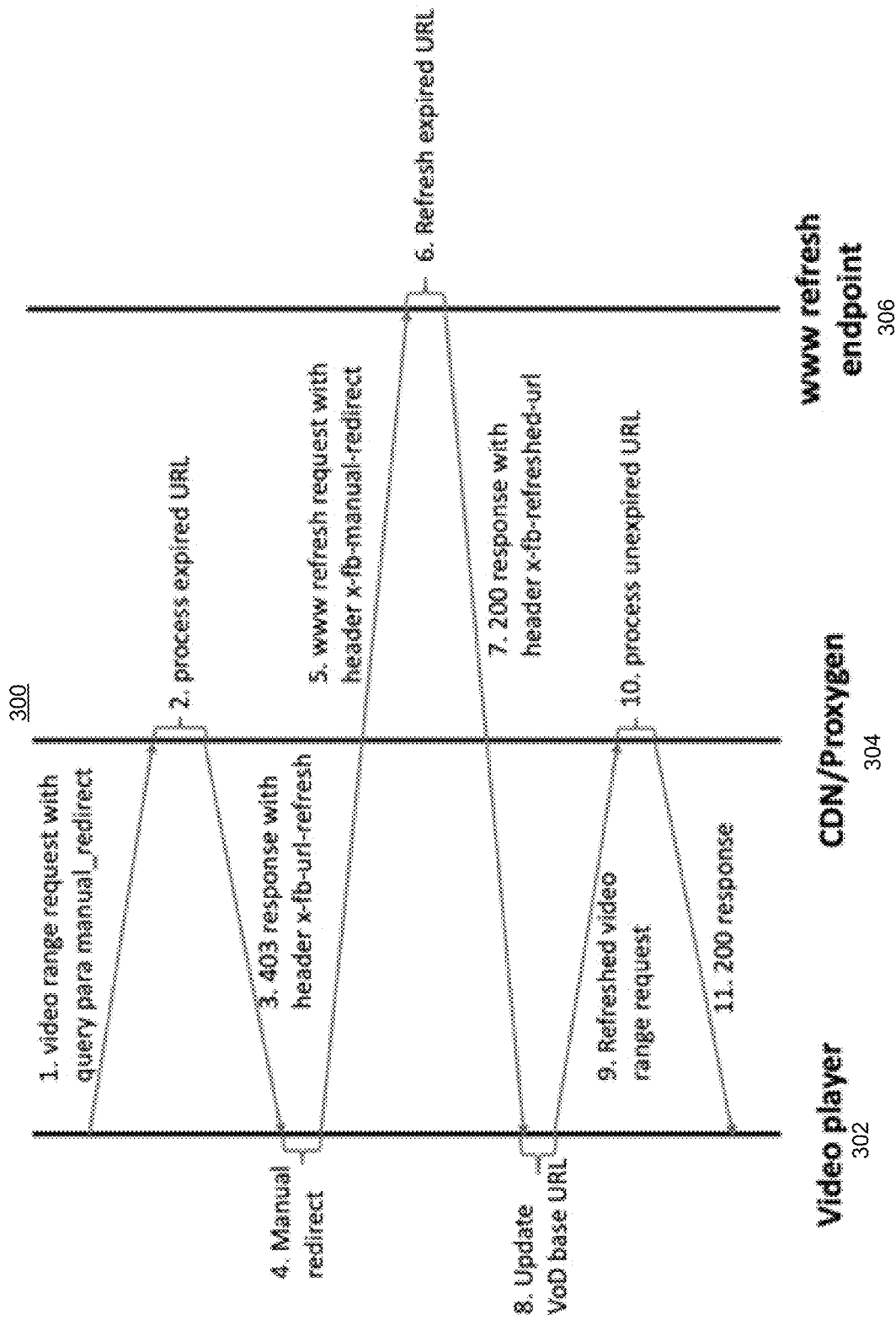
FIG. 11 shows the steps involved in the URL refresh protocol for a proprietary video player according to an example.

For content delivery network (CDN) content such as normal images and progressive videos, the browser may transparently follow the 302 redirect operation and perform the URL refresh when needed. However, a Dynamic Adaptive Streaming over HTTP (DASH) video player may use fetch Application Programming Interface (API) which cannot fulfill the URL refresh because of cross-origina resource sharing (CORS) requirement. The problem is exacerbated for long-term videos since the content delivery network (CDN) URL could expire during the playback thus causing the subsequent fetch operations to fail and the video playback to stall. To address the CORS limitations in the fetch API, a URL refresh protocol is implemented by the computer system 100 for sessions that involve Video On Demand (VoD) content to be played by a proprietary video player. This is illustrated in FIG. 11 that shows the steps involved in the URL refresh protocol for a proprietary video player. The steps for accessing video content delivery network (CDN) content via a video player 302 include step 1 wherein the video player 302 transmits a content delivery network (CDN) request with the query parameter "manual_redirect=1". In an example, the video player 302 may be executed on one of the user devices 192 or 194 and may access the URL 146 to transmit the request at step 1. Generally, multiple requests may be transmitted when video content is being accessed via the content delivery network (CDN) URL links wherein each request may pertain to a few seconds of video and a query parameter of manual-redirect is set to "1" which may be used in step 2. In step 2, the content delivery network (CDN)/Proxygen 304 e.g., the content delivery network (CDN) computer 130 checks the validity of the URL 146. More particularly, the content delivery network (CDN)/Proxygen 304 may detect that the URL 146 contains a time-limited token that has expired. Furthermore, upon detecting that the manual redirect parameter is set, the content delivery network (CDN)/Proxygen 304 may return a response that may include a refresh URL operation at step 3. By way of illustration and not limitation, the content delivery network (CDN)/Proxygen 304 may return to the video player 302, a 403 response having the response header "x-fb-url-refresh: <refresh_url>". Upon receiving the 403 response with the special request header from the content delivery network (CDN)/Proxygen 304, the video player 302 may extract the '<refresh_url>' from the header at step 4. Accordingly, the video player 302 may send a refresh request <refresh_url> to the www refresh endpoint 306 at step 5. In an example, the refresh request may be sent with the request header "x-fb-manual-redirect: true." In some examples, when the video player receives 302 response with "<refresh_url>" response header from a regular cdn request, it may send out another http request following the "<refresh_url>". This logic may be implemented, for example, in a video player. Thus, the user in this example may not need to manually do anything. The www refresh endpoint 304 may verify the expired URL at step 6 to determine if the user is authenticated to access the requested content. As described above, the data from the user session is compared with the user token i.e., the uss parameter to determine if the same user who initially received the URL 146 is requesting the refresh. If yes, the expired URL is refreshed and provided back to the video player 304 with the header "x-fb-refreshed-url: <refreshed_url>". At step 8, the video player 302 updates the VoD base URL with the refreshed URL. At step 9, the video player 302 may employ the updated URL to continue downloading the video from the content delivery network (CDN)/Proxygen 304. In steps 10 and 11 respectively, the unexpired URL is processed at the content delivery network (CDN)/Proxygen and the requested VoD content is provided to the video player 302, for example, as a 200 response.

Figure 12:
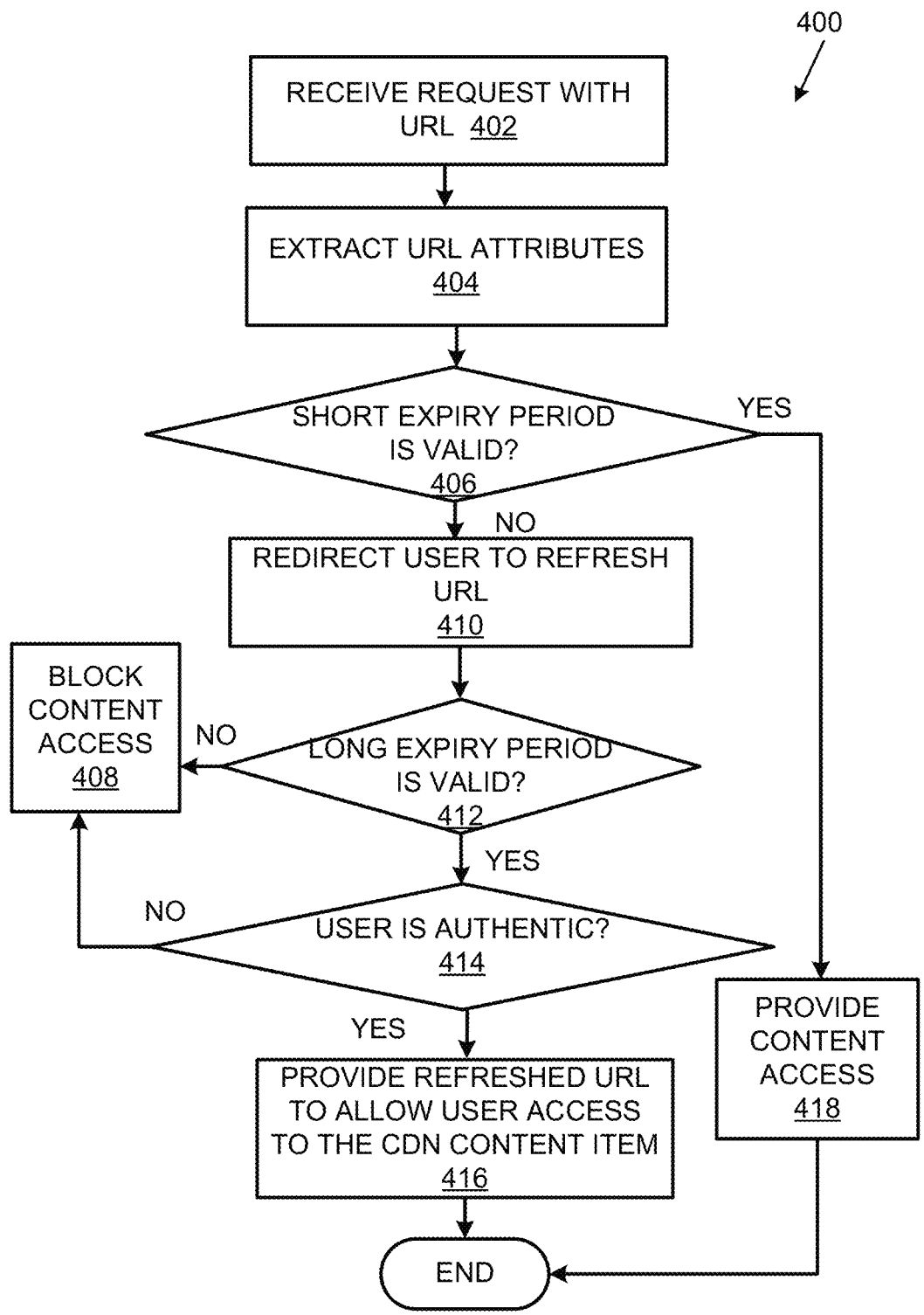
FIG. 12 shows a flowchart that details a method of controlling access to content delivery network (CDN) content according to an example.

FIG. 12 shows a flowchart 400 that details a method of controlling access to content delivery network (CDN) content according to an example. The method begins at 402 wherein the request 182 to access the content delivery network (CDN) content item 144 is received from the user device 194. In an example, the request 182 may be received from the user device 194 after the user has logged in and begun the user session so that the user may be initially identified as an authorized user. In an example, the request 182 may include the URL 146 link for the content delivery network (CDN) content item 144. At 404, the URL arguments may be extracted. The arguments may include an argument indicative of the short expiry period e.g., 'oe'. It may be determined at 406 if the short expiry period is valid. If the short expiry period has not elapsed, the method may move to 418 wherein the user may access the content delivery network (CDN) content item 144. If it is determined at 406 that the short expiry period has elapsed, the method may move to 410 wherein the user may be redirected to refresh the URL. In an example, the user may be redirected from the www urlgen 204 to www refresh endpoint 206 for a refreshed URL.

Two checks may be executed in order to refresh the URL. Initially, at 412, it may be determined if the long expiry period is valid. If it is determined at 412 that the long expiry period is not valid i.e., the long expiry period has elapsed, the URL 146 is stale and the user may be blocked from accessing the content at 408. If it is determined at 412 that the long expiry period is valid, it may be further determined at 414 if the user is an authentic user. The authenticity of the user may be determined at 414 via comparing the user data from the login session with the temporary user token i.e., the 'Liss' argument of the URL 146. If it is determined at 414 that the user is authentic, the method may move to 416 wherein a refreshed URL may be provided so that the user may access the content delivery network (CDN) content item with the refreshed URL. If it is determined at 414 that the user is not authentic, the method may move to 408 to block access to the content delivery network (CDN) content item 144.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

It should be noted that the functionality described herein may be subject to one or more privacy policies, described below, enforced by the local systems, the app server devices 120, . . . , 120n and the storage devices 180, . . . 180n, may bar the use of information obtained from one or more of the plurality of data feeds.

In particular examples, one or more objects of a computing system may be associated with one or more privacy settings. The one or more objects may be stored on or otherwise associated with any suitable computing system or application, such as, for example, the mobile device 100, the app server devices 120, . . . , 120n and the storage devices 180, . . . 180n, a social-networking application, a messaging application, a photo-sharing application, or any other suitable computing system or application. Although the examples discussed herein may be in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example, and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example, and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the mobile device 100, the app server devices 120, . . . , 120n and the storage devices 180, . . . 180n or shared with other systems. Although this disclosure describes using particular privacy settings in a particular manner, this disclosure contemplates using any suitable privacy settings in any suitable manner.

In particular examples, the mobile device 100, the app server devices 120, . . . , 120n and the storage devices 180, . . . 180n may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the mobile device 100, the app server devices 120, . . . , 120n and the storage devices 180, . . . 180n may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the mobile device 100, the app server devices 120, . . . , 120n and the storage devices 180, . . . 180n may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the mobile device 100, the app server devices 120, . . . , 120n and the storage devices 180, . . . 180n may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The mobile device 100, the app server devices 120, . . . , 120n and the storage devices 180, . . . 180n may access such information in order to provide a particular function or service to the first user, without the mobile device 100, the app server devices 120, . . . , 120n and the storage devices 180, . . . 180n having access to that information for any other purposes. Before accessing, storing, or using such objects or information, the mobile device 100, the app server devices 120, . . . , 120n and the storage devices 180, . . . 180n may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the mobile device 100, the app server devices 120, . . . , 120n and the storage devices 180, . . . 180n.

In particular examples, a user may specify whether particular types of objects or information associated with the first user may be accessed, stored, or used by the mobile device 100, the app server devices 120, . . . , 120n and the storage devices 180, . . . 180n. As an example and not by way of limitation, the first user may specify that images sent by the first user through the mobile device 100, the app server devices 120, . . . , 120n and the storage devices 180, . . . 180n may not be stored by the mobile device 100, the app server devices 120, . . . , 120n and the storage devices 180, . . . 180n. As another example and not by way of limitation, a first user may specify that messages sent from the first user to a particular second user may not be stored by the mobile device 100, the app server devices 120, . . . , 120n, and the storage devices 180, . . . 180n. As yet another example and not by way of limitation, a first user may specify that all objects sent via a particular application may be saved by the mobile device 100, the app server devices 120, . . . , 120n and the storage devices 180, . . . 180n.

In particular examples, privacy settings may allow a first user to specify whether particular objects or information associated with the first user may be accessed from the mobile device 100, the app server devices 120, . . . , 120n and the storage devices 180, . . . 180n. The privacy settings may allow the first user to opt in or opt out of having objects or information accessed from a particular device (e.g., the phone book on a user's smart phone), from a particular application (e.g., a messaging app), or from a particular system (e.g., an email server). The mobile device 100, the app server devices 120, . . . , 120n and the storage devices 180, . . . 180n may provide default privacy settings with respect to each device, system, or application, and/or the first user may be prompted to specify a particular privacy setting for each context. As an example and not by way of limitation, the first user may utilize a location-services feature of the mobile device 100, the app server devices 120, . . . , 120n and the storage devices 180, . . . 180n to provide recommendations for restaurants or other places in proximity to the user. The first user's default privacy settings may specify that the mobile device 100, the app server devices 120, . . . , 120n and the storage devices 180, . . . 180n may use location information provided from one of the user communication devices 192, 194, . . . etc., of the first user to provide the location-based services, but that the mobile device 100, the app server devices 120, . . . , 120n and the storage devices 180, . . . 180n, may not store the location information of the first user or provide it to any external system. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The mobile device 100, the app server devices 120, . . . , 120n and the storage devices 180, . . . 180n may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the mobile device 100, the app server devices 120, . . . , 120n and the storage devices 180, . . . 180n may use a user's previous activities and calculated moods, emotions, or sentiments to determine a present mood, emotion, or sentiment. A user who wishes to enable this functionality may indicate in their privacy settings that they opt in to the mobile device 100, the app server devices 120, . . . , 120n and the storage devices 180, . . . 180n receiving the inputs necessary to determine the mood, emotion, or sentiment. As an example and not by way of limitation, the mobile device 100, the app server devices 120, . . . , 120n and the storage devices 180, . . . 180n may determine that a default privacy setting is to not receive any information necessary for determining mood, emotion, or sentiment until there is an express indication from a user that the mobile device 100, the app server devices 120, . . . , 120n and the storage devices 180, . . . 180n may do so. By contrast, if a user does not opt in to the mobile device 100, the app server devices 120, . . . , 120n and the storage devices 180, . . . 180n receiving these inputs (or affirmatively opts out of the mobile device 100, the app server devices 120, . . . , 120n and the storage devices 180, . . . 180n receiving these inputs), the mobile device 100, the app server devices 120, . . . , 120n and the storage devices 180, . . . 180n may be prevented from receiving, collecting, logging, or storing these inputs or any information associated with these inputs. In particular examples, the mobile device 100, the app server devices 120, . . . , 120n and the storage devices 180, . . . 180n may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the mobile device 100, the app server devices 120, ..., 120n and the storage devices 180, ... 180n may use the user's mood, emotion, or sentiment to provide newsfeed items, pages, friends, or advertisements to a user. The user may specify in their privacy settings that the mobile device 100, the app server devices 120, ..., 120n and the storage devices 180, ... 180n may determine the user's mood, emotion, or sentiment. The user may then be asked to provide additional privacy settings to indicate the purposes for which the user's mood, emotion, or sentiment may be used. The user may indicate that the mobile device 100, the app server devices 120, ..., 120n and the storage devices 180, ... 180n may use his or her mood, emotion, or sentiment to provide newsfeed content and recommend pages, but not for recommending friends or advertisements. The mobile device 100, the app server devices 120, ..., 120n and the storage devices 180, ... 180n may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the mobile device 100, the app server devices 120, ..., 120n and the storage devices 180, ... 180n may be restricted in its access, storage, or use of the objects or information. The mobile device 100, the app server devices 120, ..., 120n and the storage devices 180, ... 180n may temporarily access, store, or use these particular objects or information in order to facilitate particular actions of a user associated with the objects or information, and may subsequently delete the objects or information, as specified by the respective privacy settings. As an example, and not by way of limitation, a first user may transmit a message to a second user, and the mobile device 100, the app server devices 120, ..., 120n and the storage devices 180, ... 180n may temporarily store the message in a content data store until the second user has viewed or downloaded the message, at which point the mobile device 100, the app server devices 120, ..., 120n and the storage devices 180, ... 180n may delete the message from the data store. As another example and not by way of limitation, continuing with the prior example, the message may be stored for a specified period of time (e.g., 2 weeks), after which point may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the mobile device 100, the app server devices 120, ..., 120n and the storage devices 180, ... 180n may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the mobile device 100, the app server devices 120, ..., 120n and the storage devices 180, ... 180n. The user's privacy settings may specify that such information may be used only for particular processes, such as authentication, and further specify that such information may not be shared with any external system or used for other processes or applications associated with the mobile device 100, the app server devices 120, ..., 120n and the storage devices 180, ... 180n. As another example and not by way of limitation, the mobile device 100, the app server devices 120, ..., 120n and the storage devices 180, ... 180n may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the mobile device 100, the app server devices 120, ..., 120n and the storage devices 180, ... 180n. As another example and not by way of limitation, the mobile device 100, the app server devices 120, ..., 120n and the storage devices 180, ... 180n may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the mobile device 100, the app server devices 120, ..., 120n and the storage devices 180, ... 180n.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The mobile device 100, the app server devices 120, . . . , 120n and the storage devices 180, . . . 180n may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the mobile device 100, the app server devices 120, . . . , 120n and the storage devices 180, . . . 180n may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the mobile device 100, the app server devices 120, . . . , 120n, and the storage devices 180, . . . 180n may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the mobile device 100, the app server devices 120, . . . , 120n and the storage devices 180, . . . 180n may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the mobile device 100, the app server devices 120, . . . , 120n and the storage devices 180, . . . 180n may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the mobile device 100, the app server devices 120, . . . , 120n and the storage devices 180, . . . 180n may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to verify a privacy setting periodically. A prompt or reminder may be periodically sent to the user based either on time elapsed or the number of user actions. As an example and not by way of limitation, the mobile device 100, the app server devices 120, . . . , 120n and the storage devices 180, . . . 180n may send a reminder to the user to confirm his or her privacy settings every six months or after every ten photo posts. In particular examples, privacy settings may also allow users to control access to the objects or information on a per-request basis. As an example and not by way of limitation, the mobile device 100, the app server devices 120, . . . , 120n and the storage devices 180, . . . 180n may notify the user whenever an external system attempts to access information associated with the user, and require the user to verify that access should be allowed before proceeding.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system for providing content, comprising:
a processor; and
a memory storing instructions, which when executed by the processor, cause the processor to:
receive a first request from a user for a first content item on a content delivery network (CDN), wherein the first request includes a first universal resource locator (URL) to the first content item, the first URL comprising at least arguments for a first long expiry period, a first short expiry period, and a temporary user id;
determine whether the first short expiry period of the first URL is valid;
in response to determining that the first short expiry period of the first URL is invalid, determine whether the first long expiry period of the first URL is valid;
in response to determining that the first long expiry period of the first URL is valid, determine whether the user is authentic; and
in response to determining that the user is authentic, provide the user access to the first content item.

2. The system of claim 1, wherein the instructions, when executed by the processor, cause the processor to:
provide user credentials associated with at least one application to an application server;
receive an attribute-based challenge from the application server, wherein the attribute-based challenge includes a challenge generated using a verifier derived from the attribute;
determine a proof to the challenge using the attribute; and
access services of the application using a login token received from the application server in response to providing the proof.

3. The system of claim 1, wherein the instructions, when executed by the processor, cause the processor to:
receive user credentials associated with at least one application from a mobile device executing the at least one application;
generate an attribute-based challenge, wherein the attribute-based challenge includes a challenge generated using a verifier derived from an attribute of the mobile device;
receive proof from the mobile device in response to the challenge; and
enable access to services of the application in response to validating the proof.

4. The system of claim 1, wherein the instructions, when executed by the processor, cause the processor to:
register to use an application with an application server;
receive data regarding an attribute to be used for a login process;
derive a zero-knowledge verifier using a value of the attribute; and
provide the encrypted zero-knowledge verifier to the application server.

5. The system of claim 1, wherein the instructions, when executed by the processor, cause the processor to:
select an attribute of a mobile device executing at least one application to authenticate the user to access the at least one application;
transmit data regarding the selection of the attribute to the mobile device;
receive a zero-knowledge verifier from the mobile device, wherein the zero-knowledge verifier is based on the attribute of the mobile device; and
employ the zero-knowledge verifier in authenticating the user to access the at least one application.

6. The system of claim 1, wherein the instructions, when executed by the processor, cause the processor to:
receive an initial communication associated with a user session;
generate a data identifier including a dynamic element;
update the dynamic element to indicate an event associated with user is activity; and
implement criteria to determine whether an associated disparity may be actionable.

7. The system of claim 6, wherein the instructions when executed by the processor further cause the processor to at least one of: require a user action in response to the associated disparity, or receive an indication of the event associated with user activity.

8. The system of claim 1, wherein to execute the backend process the instructions further cause the processor to:
extract the temporary user id from the first URL; and
authenticate the user based on a comparison of the temporary user id with user data from a login session associated with the first URL.

9. The system of claim 1, wherein to determine whether the first long expiry period is valid, the instructions further cause the processor to:
determine validity of the first long expiry period based on the argument for the first long expiry period; or
determine validity of the first short expiry period based on the argument for the first long expiry period.

10. The system of claim 1, wherein the first content item is one of an image, a progressive video, or video on demand (VOD).

11. A method for providing content to a user, the method being executed by one or more processors and comprising:
receiving a first request from a user for a first content item on a content delivery network (CDN), wherein the first request includes a first universal resource locator (URL) to the first content item, the first URL comprising at least arguments for a first long expiry period, a first short expiry period, and a temporary user id;
determining whether the first short expiry period of the first URL is valid;
in response to determining that the first short expiry period of the first URL is invalid,
determining whether the first long expiry period of the first URL is valid;
in response to determining that the first long expiry period of the first URL is valid, determining whether the user is authentic; and
in response to determining that the user is authentic, providing the user access to the first content item.

12. The method of claim 11, wherein the method further comprises:
providing user credentials associated with at least one application to an application server;
receiving an attribute-based challenge from the application server, wherein the attribute-based challenge includes a challenge generated using a verifier derived from the attribute;
determining a proof to the challenge using the attribute; and
accessing services of the application using a login token received from the application server in response to providing the proof.

13. The method of claim 11, wherein the method further comprises:
receiving an initial communication associated with a user session;
generating a data identifier including a dynamic element;
updating the dynamic element to indicate an event associated with user is activity; and
implementing criteria to determine whether an associated disparity may be actionable.

14. A non-transitory computer-readable storage medium having an executable stored thereon, which when executed by a processor causes the processor to perform operations comprising:
receiving a first request from a user for a first content item on a content delivery network (CDN), wherein the first request includes a first universal resource locator (URL) to the first content item, the first URL comprising at least arguments for a first long expiry period, a first short expiry period, and a temporary user id;
determining whether the first short expiry period of the first URL is valid;
in response to determining that the first short expiry period of the first URL is invalid, determining whether the first long expiry period of the first URL is valid;

in response to determining that the first long expiry period of the first URL is valid, determining whether the user is authentic; and in response to determining that the user is authentic, providing the user access to the first content item.

15. The non-transitory computer-readable storage medium of claim 14, wherein operations further comprise:

receiving an initial communication associated with a user session;

generating a data identifier including a dynamic element;

updating the dynamic element to indicate an event associated with user is activity; and implementing criteria to determine whether an associated disparity may be actionable.

16. The system of claim 1, wherein the instructions, when executed by the processor, cause the processor to:

further in response to determining that the user is authentic, refreshing the first URL to provide a refreshed URL, wherein the user is provided access to the first content item using the refreshed URL.

17. The system of claim 1, wherein the instructions, when executed by the processor, cause the processor to:

receive a second request for a second content item on the CDN, wherein the second request includes a second URL to the second content item;

determine whether a second short expiry period of the second URL is valid; and in response to determining that the second short expiry period of the second URL is valid, provide the user access to the second content item.

18. The system of claim 1, wherein the instructions, when executed by the processor, cause the processor to:

receive a second request for a second content item on the CDN, wherein the second request includes a second URL to the second content item;

determine whether a second short expiry period of the second URL is valid;

in response to determining that the second short expiry period of the second URL is invalid, determine whether a second long expiry period of the second URL is valid;

in response to determining that the second long expiry period of the second URL is invalid, prohibiting access to the second content item through the second URL.

\* \* \* \* \*